United States Patent
Du et al.

(10) Patent No.: US 11,804,985 B2
(45) Date of Patent: Oct. 31, 2023

(54) PACKET TRANSMISSION METHOD, APPARATUS, AND SYSTEM, AND STORAGE MEDIUM

(71) Applicant: Huawei Technologies Co., Ltd., Shenzhen (CN)

(72) Inventors: Zongpeng Du, Shenzhen (CN); Guoyi Chen, Beijing (CN); Jie Dong, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 17/146,607

(22) Filed: Jan. 12, 2021

(65) Prior Publication Data

US 2021/0167994 A1 Jun. 3, 2021

Related U.S. Application Data

(63) Continuation of application No. PCT/CN2019/095512, filed on Jul. 11, 2019.

(30) Foreign Application Priority Data

Jul. 13, 2018 (CN) .......................... 201810772430.3

(51) Int. Cl.
*G06F 11/00* (2006.01)
*H04L 12/28* (2006.01)
(Continued)

(52) U.S. Cl.
CPC .......... *H04L 12/4675* (2013.01); *H04L 45/02* (2013.01); *H04L 45/04* (2013.01); *H04L 45/54* (2013.01); *H04L 45/586* (2013.01)

(58) Field of Classification Search
CPC ... H04L 12/4675; H04L 49/70; H04L 12/467; H04L 69/40; H04L 69/14; H04L 41/065;
(Continued)

(56) References Cited

U.S. PATENT DOCUMENTS 9,628,374 B1 * 4/2017 Devilbiss ................ H04L 47/41
2003/0093709 A1 * 5/2003 Ogawa ................ H04L 41/0677
714/4.3
(Continued)

FOREIGN PATENT DOCUMENTS

CN 103001879 A 3/2013
CN 103326915 A * 9/2013 ......... H04L 12/4641
(Continued)

OTHER PUBLICATIONS

L. Ginsberg et al, "IS-IS Extensions to Support Routing over IPv6 Dataplane, draft-bashandy-isis-srv6-extensions-02.txt", Networking Working Group Internet—Draft, Mar. 19, 2018, total 17 pages.
(Continued)

*Primary Examiner* — Edan Orgad
*Assistant Examiner* — Vanneilian Lalchinthang
(74) *Attorney, Agent, or Firm* — Conley Rose, P.C.

(57) ABSTRACT

A packet transmission method, implemented by a first network device includes determining a first master logical interface, where the first master logical interface is associated with a first virtual network identifier and a first sub-logical interface, and the first sub-logical interface is associated with a second virtual network identifier, and receiving an advertisement packet from a second network device through the first master logical interface, where the advertisement packet includes the first virtual network identifier, first internet protocol (IP) information associated with the first virtual network identifier, the second virtual network identifier, and second IP information associated with the second virtual network identifier.

20 Claims, 12 Drawing Sheets

(51) Int. Cl.
  *H04L 12/723* (2013.01)
  *H04L 12/46* (2006.01)
  *H04L 45/02* (2022.01)
  *H04L 45/00* (2022.01)
  *H04L 45/586* (2022.01)

(58) Field of Classification Search
  CPC ..... H04L 45/02; H04L 45/04; H04L 12/4641;
    H04L 45/586; H04L 45/64; H04L 45/741;
    H04L 12/4625; H04L 49/3009; H04L
    49/354; H04L 45/54; G06F 11/2007;
    G06F 13/4022; G06F 2201/85
  USPC ......................................................... 370/397
  See application file for complete search history.

(56) References Cited

U.S. PATENT DOCUMENTS

| | | | | |
|---|---|---|---|---|
| 2005/0177762 A1* | 8/2005 | Singh | ................. | H04L 69/40 |
| | | | | 714/4.1 |
| 2005/0265308 A1* | 12/2005 | Barbir | ................. | H04L 12/4641 |
| | | | | 370/351 |
| 2015/0023358 A1* | 1/2015 | Tsirkin | ................. | H04L 12/56 |
| | | | | 370/401 |
| 2015/0195178 A1* | 7/2015 | Bhattacharya | ...... | H04L 41/0893 |
| | | | | 718/1 |
| 2015/0372943 A1* | 12/2015 | Hasan | ................. | H04L 45/586 |
| | | | | 709/226 |
| 2016/0234106 A1* | 8/2016 | Li | ................. | H04L 45/02 |
| 2017/0230273 A1* | 8/2017 | Helén | ................. | H04L 45/00 |
| 2018/0041420 A1* | 2/2018 | Saad | ................. | H04L 47/22 |
| 2021/0092044 A1* | 3/2021 | Tantsura | ................. | H04L 45/34 |

FOREIGN PATENT DOCUMENTS

| | | |
|---|---|---|
| CN | 103401754 A | 11/2013 |
| CN | 104378296 A | 2/2015 |
| CN | 104518935 A | 4/2015 |
| CN | 107005476 A | 8/2017 |

OTHER PUBLICATIONS

C. Filsfils et al, SRv6 Network Programming, draft-filsfils-spring-srv6-network-programming-04, Spring Internet—Draft, Mar. 4, 2018, total 57 pages.

Request for Comments: 3784, H Smit et al, Intermediate System to Intermediate System (IS-IS) Extensions for Traffic Engineering (TE), Jun. 2004, total 13 pages.

Request for Comments: 5305, T. Li et al, IS-IS Extensions for Traffic Engineering, Network Working Group, Oct. 2008, total 17 pages.

Y. Zhu, et al, "ISIS Extensions for Flexible Ethernet," draft-zcdc-isis-flexe-extention-01, Jul. 3, 2017, 8 pages.

Dong, J., "Enhanced Virtual Private Networks (VPN+)," draft-dong-teas-enhanced-vpn-00, Jul. 2, 2018, 25 pages.

* cited by examiner

| Type | Length | |
|---|---|---|
| len | Number | |
| Flag bit | Function-flag bit | Endpoint function value |
| Sizes of a first node-SID and a second node-SID | | |
| First adjacency-segment identifier | | First virtual network identifier |
| Second adjacency-segment identifier | | Second virtual network identifier |
| sub-TLV-len | | Sub-TLVs |

FIG. 8

| Type | Length | |
|---|---|---|
| Layer 3 neighbor system ID and pseudonode number | | |
| len | Number | |
| Flag bit | Function-flag bit | Endpoint function value |
| Sizes of a first adjacency-SID and a second adjacency-SID | | |
| First adjacency-segment identifier | | First virtual network identifier |
| Second adjacency-segment identifier | | Second virtual network identifier |
| sub-TLV-len | | Sub-TLVs |

FIG. 9

| Type | Length | |
|---|---|---|
| Layer 3 neighbor system ID and pseudonode number ||| 
| len | Number | |
| System identifier |||
| Flag bit | Function-flag bit | Endpoint function value |
| Sizes of a first adjacency-SID and a second adjacency-SID | | |
| First adjacency-segment identifier || First virtual network identifier |
| Second adjacency-segment identifier || Second virtual network identifier |
| sub-TLV-len || Sub-TLVs |

FIG. 10

PACKET TRANSMISSION METHOD, APPARATUS, AND SYSTEM, AND STORAGE MEDIUM

CROSS-REFERENCE TO RELATED APPLICATIONS

This application is a continuation of International Patent Application No. PCT/CN2019/095512 filed on Jul. 11, 2019, which claims priority to Chinese Patent Application No. 201810772430.3 filed on Jul. 13, 2018. The disclosures of the aforementioned applications are hereby incorporated by reference in their entireties.

TECHNICAL FIELD

This application relates to the field of communications technologies, and in particular, to a packet transmission method, apparatus, and device, and a storage medium.

BACKGROUND

Network slicing is a form of virtualization, and allows a plurality of virtual networks to run on a shared physical network infrastructure. In other words, based on one shared physical network, corresponding virtual networks (or network slices) are obtained through segmentation by using a virtualization technology, to meet different user requirements. Resource isolation between virtual networks is logically implemented, and the virtual networks are independent of each other and do not affect each other.

An important means of implementing resource isolation between virtual networks is as follows. One physical interface is virtualized into a plurality of logical interfaces, and each logical interface corresponds to one virtual network. For example, one physical interface may be divided into several logical interfaces by using a flexible Ethernet (FlexE) technology or a channelized sub-interface technology. The FlexE technology is an Ethernet interface technology developed by the optical internetworking forum (OIF). To be specific, one physical Ethernet interface may be virtualized into a plurality of virtual Ethernet interfaces. For example, one 100 gigabits per second (G) interface is virtualized into two 50 G interfaces. The channelized sub-interface technology is a technology in which different services are carried in different scheduling queues and bandwidths of the different services are ensured. The channelized sub-interface technology may also support link bandwidth isolation. For example, one 40 G physical interface is divided into one 10 G virtual interface and one 30 G virtual interface through isolation.

Resource isolation between virtual networks can be implemented by virtualizing one physical interface into a plurality of logical interfaces. However, a network device includes a plurality of logical interfaces, and each logical interface needs to flood an advertisement packet. Consequently, great transmission pressure is inevitably caused on the network device.

SUMMARY

This application provides a packet transmission method, device, and system, and a storage medium. An advertisement packet is transmitted on a master logical interface, so that a quantity of adjacencies and a quantity of advertisement packets are reduced, thereby relieving transmission pressure on a network device.

According to a first aspect, this application provides a packet transmission method, including determining, by a first network device, a first master logical interface, where the first master logical interface is associated with a first virtual network identifier and a first sub-logical interface, the first sub-logical interface is associated with a second virtual network identifier, the first virtual network identifier is used to identify a first virtual network, and the second virtual network identifier is used to identify a second virtual network, and receiving, by the first network device, an advertisement packet from a second network device through the first master logical interface, where the advertisement packet includes the first virtual network identifier, first Internet Protocol (IP) information associated with the first virtual network identifier, the second virtual network identifier, and second IP information associated with the second virtual network identifier, the first IP information is IP information of the second network device in the first virtual network, and the second IP information is IP information of the second network device in the second virtual network.

Beneficial effects of this application are as follows. In this embodiment of this application, when a network device implements resource isolation through a plurality of logical interfaces, an advertisement packet of the network device is transmitted on a master logical interface (for example, the second network device sends the advertisement packet through the second master logical interface, and the first network device receives the advertisement packet through the first master logical interface), so that a quantity of adjacencies in a network and a quantity of advertisement packets in the network are reduced, thereby relieving great transmission pressure on the network device.

In a possible design, the first network device generates a network topology of the second virtual network based on the second virtual network identifier, where the network topology of the second virtual network includes the first master logical interface and the second IP information. The first network device generates a second forwarding entry in which the second IP information is used as destination IP information, where an outbound interface in the second forwarding entry is the first master logical interface. The first network device determines the first sub-logical interface based on the first master logical interface and the second virtual network identifier. The first network device replaces the first master logical interface in the second forwarding entry with the first sub-logical interface.

In another possible design, the first network device generates a network topology of the first virtual network based on the first virtual network identifier, where the network topology of the first virtual network includes the first master logical interface and the first IP information. The first network device generates a first forwarding entry in which the first IP information is used as destination IP information, where an outbound interface in the first forwarding entry is the first master logical interface.

In this application, an outbound interface in a forwarding entry may be accurately determined in the foregoing two optional manners, so as to ensure that the first network device can reliably transmit an advertisement packet of the first network device.

In a possible design, before the determining, by a first network device, a first master logical interface, the method further includes configuring, by the first network device, the first master logical interface and the first sub-logical interface, configuring the first sub-logical interface as a slave interface of the first master logical interface, and establishing an association relationship between the first sub-logical interface and the second virtual network identifier and an association relationship between the first master logical interface, the first virtual network identifier, and the second virtual network identifier.

In a possible design, the advertisement packet is an advertisement packet based on an intermediate system to intermediate system (ISIS) protocol, the advertisement packet includes a type-length-value (TLV), and the TLV includes the first virtual network identifier, the second virtual network identifier, a first node-segment identifier (SID) of the second network device in the first virtual network, and a second node-SID of the second network device in the second virtual network. The first node-SID corresponds to the first virtual network identifier, and the second node-SID corresponds to the second virtual network identifier. Optionally, the TLV further includes at least one of the following a flag bit (Flags), a function-flag bit (Func-Flags), an endpoint function value, sizes of the first node-SID and the second node-SID, at least one sub-TLV, and a total length (sub-TLV-len) of all sub-TLVs.

The Flags, the Func-Flags, the endpoint function value, the sizes of the first node-SID and the second node-SID, the at least one sub-TLV, and the sub-TLV-len of all the sub-TLVs in the TLV may be used as public fields of the first virtual network identifier and the second virtual network identifier. In other words, the first virtual network identifier is the same as the second virtual network identifier in terms of the foregoing fields. Therefore, only one set of the foregoing fields need to be configured in one TLV. In this manner, the TLV can be compressed, thereby improving TLV transmission efficiency.

In a possible design, the advertisement packet is an advertisement packet based on an ISIS protocol, the advertisement packet includes a TLV, and the TLV includes the first virtual network identifier, the second virtual network identifier, a first adjacency-SID of the second network device in the first virtual network, and a second adjacency-SID of the second network device in the second virtual network. The first adjacency-SID corresponds to the first virtual network identifier, and the second adjacency-SID corresponds to the second virtual network identifier. Optionally, the TLV further includes at least one of the following Flags, Func-Flags, an endpoint function value, sizes of the first adjacency-SID and the second adjacency-SID, at least one sub-TLV, and a sub-TLV-len of all sub-TLVs.

The Flags, the Func-Flags, the endpoint function value, the sizes of the first adjacency-SID and the second adjacency-SID, the at least one sub-TLV, and the sub-TLV-len of all the sub-TLVs included in the TLV may be used as public fields of the first virtual network identifier and the second virtual network identifier. In other words, the first virtual network identifier is the same as the second virtual network identifier in terms of the foregoing fields. Therefore, only one set of the foregoing fields need to be configured in one TLV. In this manner, the TLV can be compressed, thereby improving TLV transmission efficiency.

The following provides a method embodiment corresponding to a second network device side. For an effect thereof, refer to an effect of the method embodiment corresponding to the first network device side. Details are not described below again.

According to a second aspect, this application provides a packet transmission method, including determining, by a second network device, a second master logical interface, where the second master logical interface is associated with a first virtual network identifier and a second sub-logical interface, the second sub-logical interface is associated with a second virtual network identifier, the first virtual network identifier is used to identify a first virtual network, and the second virtual network identifier is used to identify a second virtual network, and sending, by the second network device, an advertisement packet to a first network device through the second master logical interface, where the advertisement packet includes the first virtual network identifier, first IP information corresponding to the first virtual network identifier, the second virtual network identifier, and second IP information corresponding to the second virtual network identifier, the first IP information is IP information of the second network device in the first virtual network, and the second IP information is IP information of the second network device in the second virtual network.

In a possible design, before the determining, by a second network device, a second master logical interface, the method further includes configuring, by the second network device, the second master logical interface and the second sub-logical interface, configuring the second sub-logical interface as a slave interface of the second master logical interface, and establishing an association relationship between the second sub-logical interface and the second virtual network identifier and an association relationship between the second master logical interface, the first virtual network identifier, and the second virtual network identifier.

In a possible design, the advertisement packet is an advertisement packet based on an ISIS protocol, the advertisement packet includes a TLV, and the TLV includes the first virtual network identifier, the second virtual network identifier, a first node-SID of the second network device in the first virtual network, and a second node-SID of the second network device in the second virtual network. The first node-SID corresponds to the first virtual network identifier, and the second node-SID corresponds to the second virtual network identifier. Optionally, the TLV further includes at least one of the following Flags, Func-Flags, an endpoint function value, sizes of the first node-SID and the second node-SID, at least one sub-TLV, and a sub-TLV-len of all sub-TLV s.

In a possible design, the advertisement packet is an advertisement packet based on an ISIS protocol, the advertisement packet includes a TLV, and the TLV includes the first virtual network identifier, the second virtual network identifier, a first adjacency-SID of the second network device in the first virtual network, and a second adjacency-SID of the second network device in the second virtual network. The first adjacency-SID corresponds to the first virtual network identifier, and the second adjacency-SID corresponds to the second virtual network identifier. Optionally, the TLV further includes at least one of the following Flags, Func-Flags, an endpoint function value, sizes of the first adjacency-SID and the second adjacency-SID, at least one sub-TLV, and a sub-TLV-len of all sub-TLVs.

The following provides some embodiments of an apparatus, a system, a storage medium, and a computer program product. For effects thereof, refer to the effects of the foregoing method embodiments. Details are not described below again.

According to a third aspect, this application provides a network device serving as a first network device, and the first network device includes a determining module and a receiving module. The determining module is configured to determine a first master logical interface, where the first master logical interface is associated with a first virtual network identifier and a first sub-logical interface, the first sub-logical interface is associated with a second virtual network identifier, the first virtual network identifier is used to identify a first virtual network, and the second virtual network identifier is used to identify a second virtual network. The receiving module is configured to receive an advertisement packet from a second network device through the first master logical interface, where the advertisement packet includes the first virtual network identifier, first IP information associated with the first virtual network identifier, the second virtual network identifier, and second IP information associated with the second virtual network identifier, the first IP information is IP information of the second network device in the first virtual network, and the second IP information is IP information of the second network device in the second virtual network.

According to a fourth aspect, this application provides a network device serving as a second network device, and the second network device includes a determining module and a sending module. The determining module is configured to determine a second master logical interface, where the second master logical interface is associated with a first virtual network identifier and a second sub-logical interface, the second sub-logical interface is associated with a second virtual network identifier, the first virtual network identifier is used to identify a first virtual network, and the second virtual network identifier is used to identify a second virtual network. The sending module is configured to send an advertisement packet to a first network device through the second master logical interface, where the advertisement packet includes the first virtual network identifier, first IP information corresponding to the first virtual network identifier, the second virtual network identifier, and second IP information corresponding to the second virtual network identifier, the first IP information is IP information of the second network device in the first virtual network, and the second IP information is IP information of the second network device in the second virtual network.

According to a fifth aspect, this application provides a network device serving as a first network device, and the first network device includes a processor and a transceiver. The processor is configured to determine a first master logical interface, where the first master logical interface is associated with a first virtual network identifier and a first sub-logical interface, the first sub-logical interface is associated with a second virtual network identifier, the first virtual network identifier is used to identify a first virtual network, and the second virtual network identifier is used to identify a second virtual network. The transceiver is configured to receive an advertisement packet from a second network device through the first master logical interface, where the advertisement packet includes the first virtual network identifier, first IP information associated with the first virtual network identifier, the second virtual network identifier, and second IP information associated with the second virtual network identifier, the first IP information is IP information of the second network device in the first virtual network, and the second IP information is IP information of the second network device in the second virtual network.

According to a sixth aspect, this application provides a network device serving as a second network device, and the second network device includes a processor and a transceiver. The processor is configured to determine a second master logical interface, where the second master logical interface is associated with a first virtual network identifier and a second sub-logical interface, the second sub-logical interface is associated with a second virtual network identifier, the first virtual network identifier is used to identify a first virtual network, and the second virtual network identifier is used to identify a second virtual network. The transceiver is configured to send an advertisement packet to a first network device through the second master logical interface, where the advertisement packet includes the first virtual network identifier, first IP information corresponding to the first virtual network identifier, the second virtual network identifier, and second IP information corresponding to the second virtual network identifier, the first IP information is IP information of the second network device in the first virtual network, and the second IP information is IP information of the second network device in the second virtual network.

According to a seventh aspect, this application provides a computer-readable medium, including an instruction. When the instruction is run on a computer, the computer is enabled to perform the method according to any one of the first aspect and the optional manners of the first aspect.

According to an eighth aspect, this application provides a computer-readable medium, including an instruction. When the instruction is run on a computer, the computer is enabled to perform the method according to any one of the second aspect and the optional manners of the second aspect.

According to a ninth aspect, this application provides a computer program product, including an instruction. The instruction is used to implement the method according to any one of the first aspect and the optional manners of the first aspect.

According to a tenth aspect, this application provides a computer program product, including an instruction. The instruction is used to implement the method according to any one of the second aspect and the optional manners of the second aspect.

According to an eleventh aspect, this application provides a packet transmission system. The system includes the first network device according to any one of the third aspect and the optional manners of the third aspect and the second network device according to any one of the fourth aspect and the optional manners of the fourth aspect, or includes the first network device according to any one of the fifth aspect and the optional manners of the fifth aspect and the second network device according to any one of the sixth aspect and the optional manners of the sixth aspect.

This application provides the packet transmission method, device, and system, and the storage medium. Both an advertisement packet of a sub-logical interface and an advertisement packet of a master logical interface are transmitted on the master logical interface, so that a quantity of adjacencies and a quantity of advertisement packets can be reduced, thereby relieving transmission pressure on a network device.

BRIEF DESCRIPTION OF DRAWINGS

FIG. 8 is a schematic diagram of a TLV according to an embodiment of this application.

FIG. 9 is a schematic diagram of a TLV according to an embodiment of this application.

FIG. 10 is a schematic diagram of a TLV according to an embodiment of this application.

DESCRIPTION OF EMBODIMENTS

Before the technical solutions of this application are described, the following first describes application scenarios of the technical solutions of this application. Specifically, the technical solutions of this application are applicable to at least the following two application scenarios.

Figure 1:
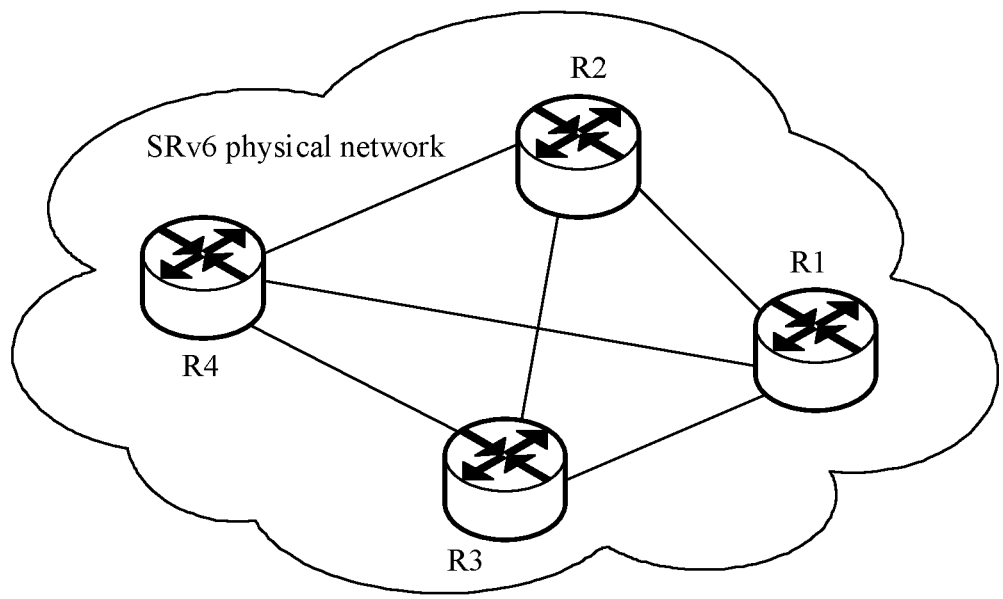
FIG. 1 is a schematic diagram of a sliced network based on segment routing over IP version 6 (SRv6) technology according to an embodiment of this application.

FIG. 1 is a schematic diagram of a sliced network based on an SRv6 technology according to an embodiment of this application. As shown in FIG. 1, this application may be applied to an SRv6 network. Generally, the SRv6 network includes a plurality of network devices that support an IP version 6 (IPv6) segment routing technology. The network device may be a device such as a router or a switch. The router or the switch may be a physical device, or may be a virtualization technology-based virtual device (for example, a virtual server, a virtual router, or a virtual switch). As shown in FIG. 1, an example in which the SRv6 network includes a network device R1, a network device R2, a network device R3, and a network device R4 is used. The network devices in the SRv6 network interact with each other by using an interior gateway protocol (IGP), to flood an IGP advertisement packet. The IGP advertisement packet includes link information and the like of R1, R2, R3, and R4. The link information is used to discover a network topology of the SRv6 network and generate a route forwarding entry. The SRv6 network (SRv6 physical network) may be divided into a plurality of virtual networks. This is an application scenario of this application.

Figure 2:
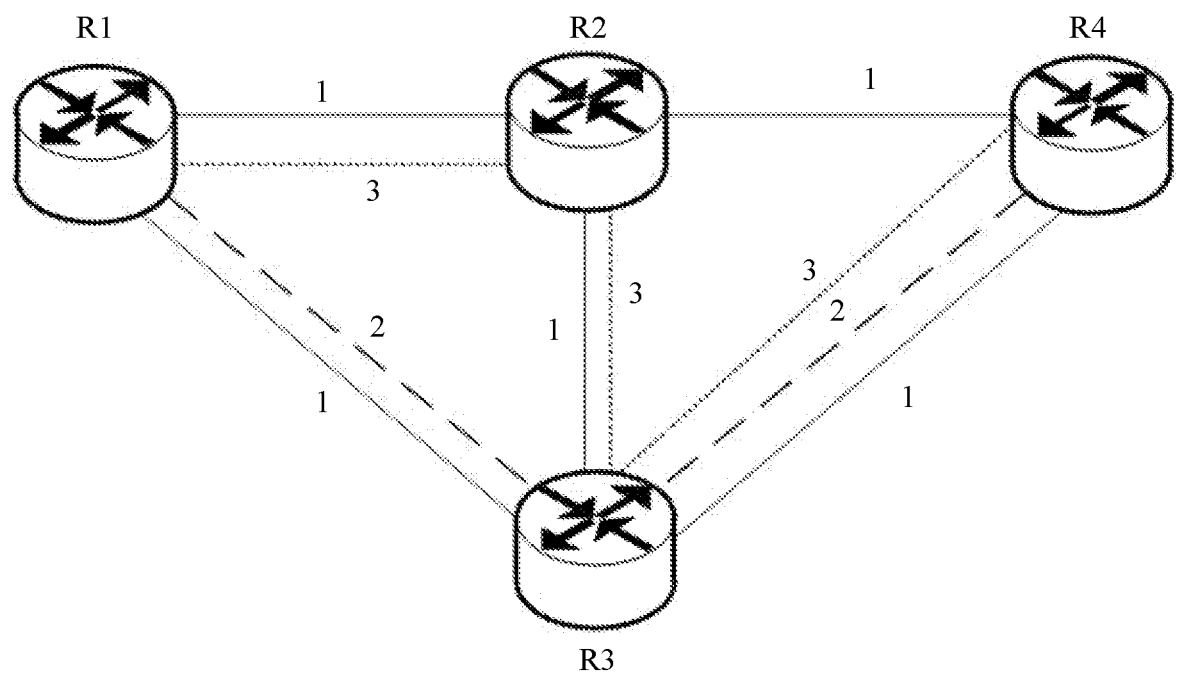
FIG. 2 is a schematic diagram in which a physical interface is divided into a plurality of logical interfaces according to an embodiment of this application.

An important means of implementing resource isolation between virtual networks or a means of dividing the SRv6 network into a plurality of virtual networks is to divide one physical interface of a network device into a plurality of logical interfaces by using a FlexE technology or a channelized sub-interface technology. For example, FIG. 2 is a schematic diagram in which a physical interface is divided into a plurality of logical interfaces according to an embodiment of this application. As shown in FIG. 2, a network device A includes a physical interface 1, and the physical interface 1 is divided into three logical interfaces a logical interface 11, a logical interface 12, and a logical interface 13. A network device B includes a physical interface 2, and the physical interface 2 is divided into three logical interfaces a logical interface 21, a logical interface 22, and a logical interface 23. The network device A and the network device B may communicate with each other through a logical interface between the network device A and the network device B. The logical interfaces each are provided with an exclusive bandwidth, and belong to different virtual networks, so that resource isolation between the virtual networks is implemented. Topology information (including link information) of each virtual network and configuration information (including an SID configuration) of each logical interface are advertised based on IGP or border gateway protocol (BGP), for example, a node-SID of each virtual network and an adjacency-SID of a link. Optionally, the network device may send a virtual network identifier while releasing these SIDs, or the network device may send a virtual network identifier while releasing an IP prefix corresponding to a local SID space of each virtual network. Optionally, the network device may construct, based on link information that is in an advertisement packet and that is related to a virtual network identifier, a network topology corresponding to each virtual network, and calculate a corresponding shortest path according to a shortest path first (SPF) algorithm, so as to determine information such as an outbound interface of each destination IP in a routing table. This implements correct traffic forwarding in the virtual network.

Figure 3:
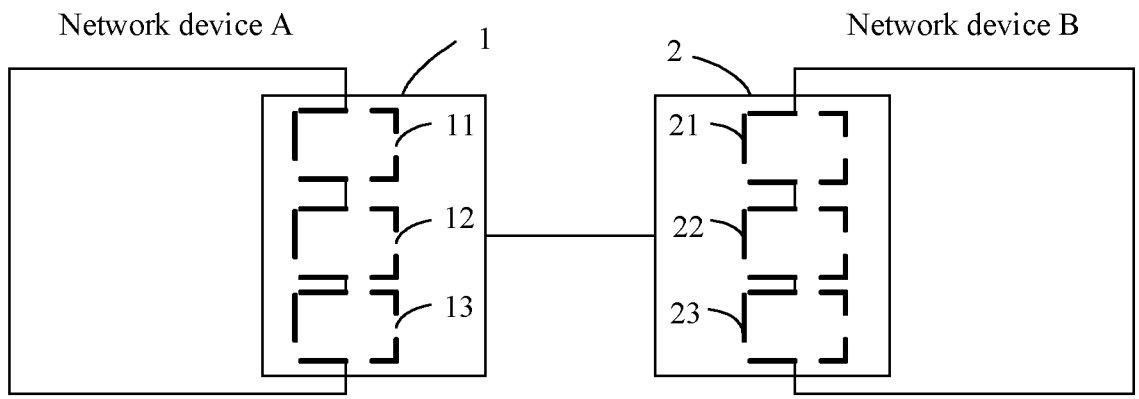
FIG. 3 is a schematic diagram of an application scenario of a multi-topology (MT) network according to an embodiment of the present disclosure.

FIG. 3 is a schematic diagram of an application scenario of an MT network according to an embodiment of the present disclosure. As shown in FIG. 3, this application may be applied to an MT network. Generally, the MT network includes a plurality of network devices. The network device may be a device such as a router or a switch. The router or the switch may be a physical device, or may be a virtualization technology-based virtual device (for example, a virtual server, a virtual router, or a virtual switch). As shown in FIG. 2, R1, R2, R3, and R4 that are connected by using a plurality of lines 1 constitute a physical network topology, R1, R3, and R4 that are connected by using a plurality of lines 2 constitute a logical network topology, and R1, R2, R3, and R4 that are connected by using a plurality of lines 3 constitute another logical network topology. The physical network topology and the logical network topology jointly constitute a MT network.

A difference between this application scenario and the foregoing implementation of the virtual network based on the SRv6 technology is as follows. In this scenario, a network topology does not need to be constructed by identifying ownership of link information in a network by using a virtual network identifier, and instead, a sliced network topology is directly constructed by using a standardized and mature MT technology. In this application scenario, the network also needs to support SRv6.

Currently, resource isolation between network topologies cannot be implemented by using the MT technology. In this application, resource isolation between network topologies is implemented by using the following means. One physical interface of a network device is divided into a plurality of logical interfaces by using a FlexE technology or a channelized sub-interface technology. As shown in FIG. 2, the logical interfaces each are provided with an exclusive bandwidth, and belong to different network topologies, so that resource isolation between the different topologies is implemented. Topology information (including link information) of each network topology and configuration information (including an SID configuration) of each logical interface are advertised based on IGP or BGP, for example, a node-SID of each network topology and an adjacency-SID of a link. Optionally, the network device may send a network topology identifier while releasing these SIDs, or the network device may send a network topology identifier while releasing an IP prefix corresponding to a local SID space of each network topology. Optionally, the network device may construct, based on link information that is in an advertisement packet and that is related to a network topology identifier, a network topology corresponding to each network topology identifier, and calculate a corresponding shortest path according to an SPF algorithm, so as to determine information such as an outbound interface of each destination IP in a routing table. This implements correct traffic forwarding in the MT network.

As demonstrated by the foregoing two application scenarios, certain approaches have a technical problem. For example, a network device includes a plurality of logical interfaces, and the logical interfaces need to flood an advertisement packet. Consequently, great transmission pressure is inevitably caused on the network device. To address this technical problem, examples of this application provide a packet transmission method, apparatus, and device, and a storage medium.

Embodiment 1

An embodiment of this application provides a packet transmission method. Network elements used in the method include a first network device and a second network device. The first network device includes a first master logical interface and a first sub-logical interface. Further, the first master logical interface is associated with a first virtual network identifier and the first sub-logical interface. That the first master logical interface is associated with the first sub-logical interface means that the first master logical interface is used as a master logical interface of the first network device, and the first sub-logical interface is used as a sub-logical interface of the first network device. The master logical interface of the first network device is configured to receive an advertisement packet flooded (flooding) by the second network device. Further, the first sub-logical interface is associated with a second virtual network identifier. The first virtual network identifier is used to identify a first virtual network, and the second virtual network identifier is used to identify a second virtual network.

It should be noted that the first network device includes the first master logical interface and the first sub-logical interface, but the first network device may further include more sub-logical interfaces. There is a master-slave relationship between each of these sub-logical interfaces and the first master logical interface.

It should be further noted that the first sub-logical interface is used as a slave sub-logical interface and does not directly participate in IGP interaction, instead, the master logical interface sends related link information, configuration information, and the like.

The second network device includes a second master logical interface and a second sub-logical interface. Further, the second master logical interface is associated with the first virtual network identifier and the second sub-logical interface. That the second master logical interface is associated with the second sub-logical interface means that the second master logical interface is used as a master logical interface of the second network device, and the second sub-logical interface is used as a sub-logical interface of the second network device. The master logical interface of the second network device is configured to flood an advertisement packet. Further, the second sub-logical interface is associated with the second virtual network identifier.

It should be noted that the second network device includes the second master logical interface and the second sub-logical interface, but the second network device may further include more sub-logical interfaces. There is a master-slave relationship between each of these sub-logical interfaces and the second master logical interface.

It should be further noted that the second sub-logical interface is used as a slave sub-logical interface and does not directly participate in IGP interaction, instead, the master logical interface sends related link information, configuration information, and the like.

Figure 4:
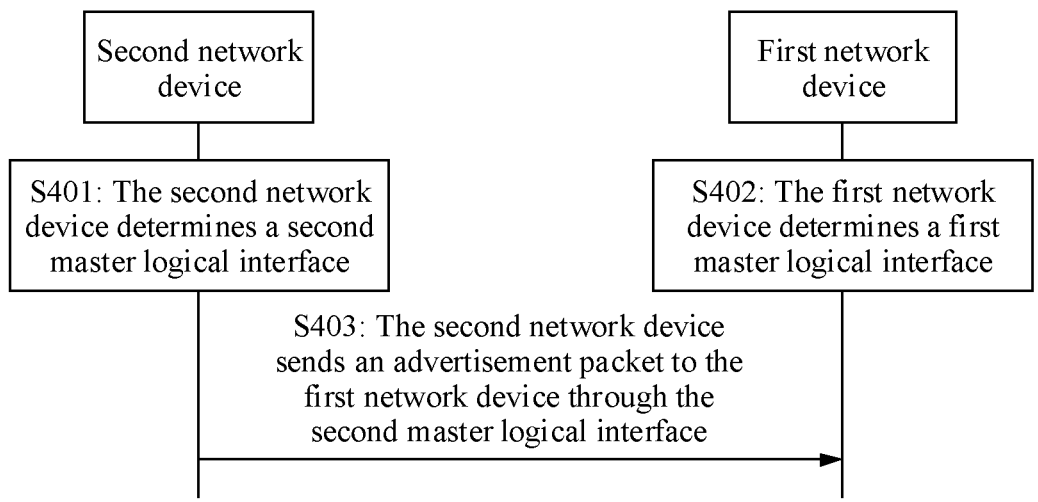
FIG. 4 is an interaction flowchart of a packet transmission method according to an embodiment of this application.

Specifically, FIG. 4 is an interaction flowchart of a packet transmission method according to an embodiment of this application. As shown in FIG. 4, the method includes the following steps.

Step S401. The second network device determines the second master logical interface.

Optionally, before step S401, the second network device configures the second master logical interface and the second sub-logical interface. For the second master logical interface, the second network device configures at least one of an interface IP address, a subnet mask, a bandwidth, and adjacency-SID information. In addition, the second network device needs to configure first IP information, second IP information, and node-SID information corresponding to different virtual networks. The first IP information is IP information of the second network device in the first virtual network, and the second IP information is IP information of the second network device in the second virtual network.

Optionally, the second network device establishes an association relationship between the first master logical interface, the first virtual network identifier, and the second virtual network identifier. In addition, the second network device configures the second sub-logical interface as a member of the second master logical interface. In other words, the second network device establishes a master-slave relationship between the second master logical interface and the second sub-logical interface.

For the second sub-logical interface, the second network device configures at least one of a bandwidth and adjacency-SID information.

Optionally, the second network device establishes an association relationship between the first sub-logical interface and the second virtual network identifier.

It should be noted that 1. In the SRv6 network, the first IP information and the second IP information of the second network device may be IP address prefixes corresponding to an SRv6 SID space. For example, the first IP information is A2:1::/48, and the second IP information is A2:2:2::/48, where A2:1::/48 corresponds to a local SID space of the second network device in the first virtual network, and A2:2::/48 corresponds to a local SID space of the second network device in the second virtual network. 2. If an MT technology is not used in the SRv6 network, a virtual network identifier in the SRv6 network may be referred to as a slice identifier (Slice ID). If an MT technology is used in the network, a virtual network identifier may be referred to as an MT identifier (MT ID) in the MT network. 3. Because the second network device does not release an advertisement packet through the second sub-logical interface, the second network device may not configure IP information of the second sub-logical interface. 4. The bandwidth corresponding to the second master logical interface is a bandwidth assigned to the first virtual network on the link of the second network device, and the bandwidth corresponding to the second sub-logical interface may be a corresponding bandwidth assigned to the second virtual network on the link of the second network device.

Figure 5:
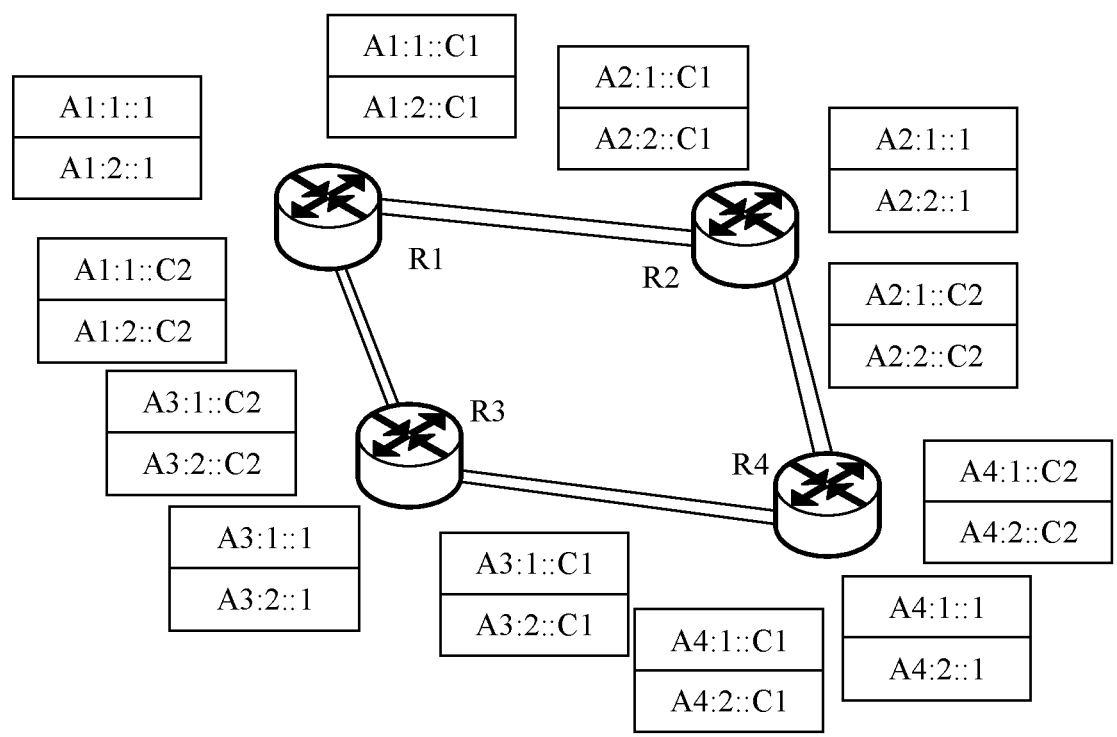
FIG. 5 is a schematic diagram of a network according to an embodiment of this application.

Further, FIG. 5 is a schematic diagram of a network according to an embodiment of this application. As shown in FIG. 5, a physical network (the foregoing MT or SRv6 network) is sliced into a first virtual network and a second virtual network, and each network device may configure "End function" (one of the foregoing node SIDs) and "End.X function" (one of the foregoing adjacency SIDs) of the network device. For example, "End function" of a network device 1 is A1:1::1 and A1:2::1, and "End.X function" of the network device 1 is A1:1::C1, A1:2::C1, A1:1::C2, and A1:2::C2. It is assumed that a local SID space of the network device 1 is A1:1::/48. In addition, in network SID planning, a locator (LOC) part occupies 48 bits, and a function (FUNC) part occupies 80 bits.

Optionally, the second network device may further determine link information of the second network device in the first virtual network and link information of the second network device in the second virtual network. The link information may be used by a device (for example, the first network device) in the network to generate a route forwarding entry.

Step S402. The first network device determines the first master logical interface.

Optionally, before step S402, the first network device configures the first master logical interface and the first sub-logical interface. For the first master logical interface, the first network device configures at least one of a bandwidth and adjacency-SID information. In addition, the first network device needs to configure third IP information, fourth IP information, and node-SID information corresponding to different virtual networks. The third IP information is IP information of the first network device in the first virtual network, and the fourth IP information is IP information of the first network device in the second virtual network.

Optionally, the first network device establishes an association relationship between the first master logical interface, the first virtual network identifier, and the second virtual network identifier. In addition, the first network device configures the first sub-logical interface as a member of the first master logical interface. In other words, the first network device establishes a master-slave relationship between the first master logical interface and the first sub-logical interface.

For the first sub-logical interface, the first network device configures at least one of a bandwidth and adjacency-SID information.

Optionally, the first network device establishes an association relationship between the first sub-logical interface and the second virtual network identifier.

It should be noted that 1. In the SRv6 network, the third IP information and the fourth IP information of the first network device may be IP address prefixes corresponding to an SRv6 SID space. For example, the third IP information is A1:1::/48, and the fourth IP information is A1:2::/48, where A1:1::/48 corresponds to a local SID space of the first network device in the first virtual network, and A1:2::/48 corresponds to a local SID space of the first network device in the second virtual network. 2. Because the first network device does not release an advertisement packet through the first sub-logical interface, the first network device may not configure IP information of the first sub-logical interface. 3. The bandwidth corresponding to the first master logical interface is a bandwidth assigned to the first virtual network on the link of the first network device, and the bandwidth corresponding to the first sub-logical interface may be a corresponding bandwidth assigned to the second virtual network on the link of the first network device.

Further, the first network device may further configure "End function" and "End.X function of the first network device.

Optionally, the first network device may further determine link information of the first network device in the first virtual network and link information of the first network device in the second virtual network. The link information may be used by a device (for example, the second network device) in the network to generate a route forwarding entry.

Step S403. The second network device sends an advertisement packet to the first network device through the second master logical interface.

Optionally, the advertisement packet includes the first virtual network identifier, the first IP information associated with the first virtual network identifier, the second virtual network identifier, and the second IP information associated with the second virtual network identifier.

Optionally, the advertisement packet further includes another configuration in addition to the first virtual network identifier, the first IP information associated with the first virtual network identifier, the second virtual network identifier, and the second IP information associated with the second virtual network identifier, for example, the bandwidth of the second master logical interface, the bandwidth of the second sub-logical interface, and "End.function" and "End.X function" of the second network device.

Optionally, the advertisement packet further includes other link information of the second network device in the first virtual network and other link information of the second network device in the second virtual network.

It should be noted that content of the advertisement packet is not limited in this application.

Further, the advertisement packet may be an IGP-based advertisement packet. Further, the advertisement packet may be an advertisement packet based on an ISIS.

In conclusion, in this embodiment of this application, when a network device implements resource isolation through a plurality of logical interfaces, an advertisement packet of the network device is transmitted on a master logical interface (for example, the second network device sends the advertisement packet through the second master logical interface, and the first network device receives the advertisement packet through the first master logical interface), so that a quantity of IGP adjacencies that need to be established in the network and a quantity of advertisement packets in the network are reduced, thereby relieving transmission and processing pressure on the network device.

Embodiment 2

Figure 6:
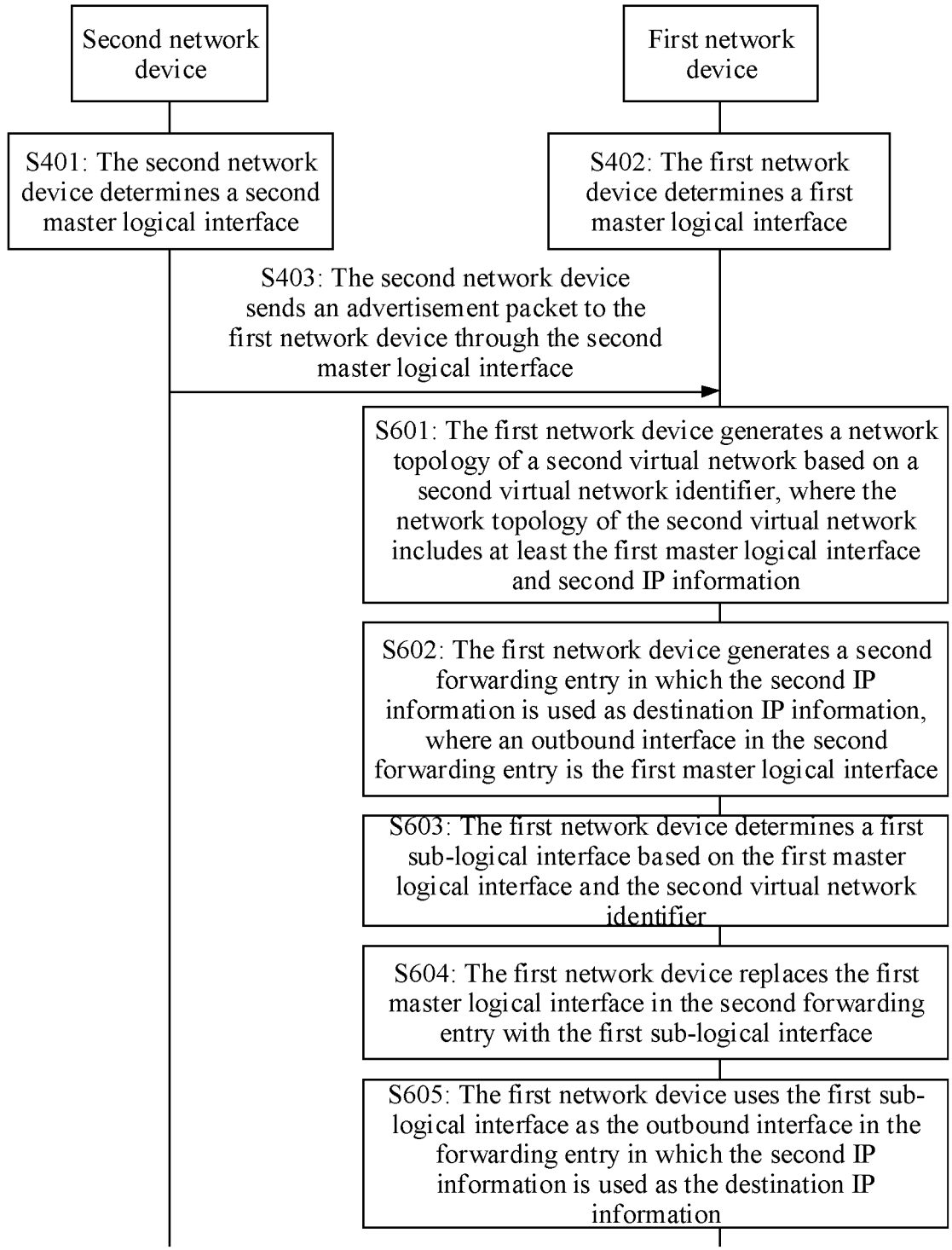
FIG. 6 is an interaction flowchart of a packet transmission method according to another embodiment of this application.

Optionally, after step S403, the method further includes generating, by the first network device, a route forwarding entry. Specifically, FIG. 6 is an interaction flowchart of a packet transmission method according to another embodiment of this application. As shown in FIG. 6, the method includes the following steps.

Step S601. The first network device generates a network topology of the second virtual network based on the second virtual network identifier, where the network topology of the second virtual network includes at least the first master logical interface and the second IP information.

Step S602. The first network device generates a second forwarding entry in which the second IP information is used as destination IP information, where an outbound interface in the second forwarding entry is the first master logical interface.

Step S603. The first network device determines the first sub-logical interface based on the first master logical interface and the second virtual network identifier.

Step S604. The first network device replaces the first master logical interface in the second forwarding entry with the first sub-logical interface.

Step S605. The first network device uses the first sub-logical interface as the outbound interface in the second forwarding entry in which the second IP information is used as the destination IP information.

Specifically, step S601 includes the first network device determines the second virtual network based on the second virtual network identifier, obtains related link information of the second network device in the second virtual network (including first link information of the second network device in the second virtual network) and at least one piece of second link information of another network device in the second virtual network, and generates the network topology of the second virtual network based on the first link information and the at least one piece of second link information. Another network device corresponds to the at least one piece of second link information. The first network device may generate the network topology of the second virtual network based on the first link information and the at least one piece of second link information in other approaches. Details are not described in this application.

Optionally, in step S602, the first network device calculates a shortest path to another node in the second virtual network based on the collected network topology of the second virtual network, and generates the second forwarding entry in which the second IP information is used as the destination IP information. For example, the outbound interface in the second forwarding entry is the first master logical interface (it is assumed herein that the calculated shortest path from the first network device to the second network device is a path from the first master logical interface to the second master logical interface). An advertisement packet of the first network device is sent through the first master logical interface, and a sub-logical interface of the first network device does not participate in IGP advertisement. Therefore, the outbound interface obtained through calculation in step S602 may be not the sub-logical interface, but the first master logical interface.

Further, descriptions are provided with reference to step S603 to step S605. When the outbound interface obtained through calculation in step S602 is the first master logical interface, the first network device determines the first sub-logical interface based on the first master logical interface and the second virtual network identifier. The first sub-logical interface corresponds to the second virtual network identifier. When the outbound interface is the first master logical interface, the first network device replaces the first master logical interface with the first sub-logical interface.

In this embodiment of this application, an advertisement packet of the second network device is received through the first master logical interface (that is, a master logical interface) of the first network device. Therefore, first, the outbound interface obtained by the first network device through calculation is the first master logical interface, and then the first network device determines the first sub-logical interface based on the first master logical interface and the second virtual network identifier. When the outbound interface is the first master logical interface, the first network device replaces the first master logical interface with the first sub-logical interface. In conclusion, by using the method, the first network device can accurately determine an outbound interface in a forwarding entry, so as to ensure that the first network device can reliably transmit a packet in the second virtual network.

Embodiment 3

Figure 7:
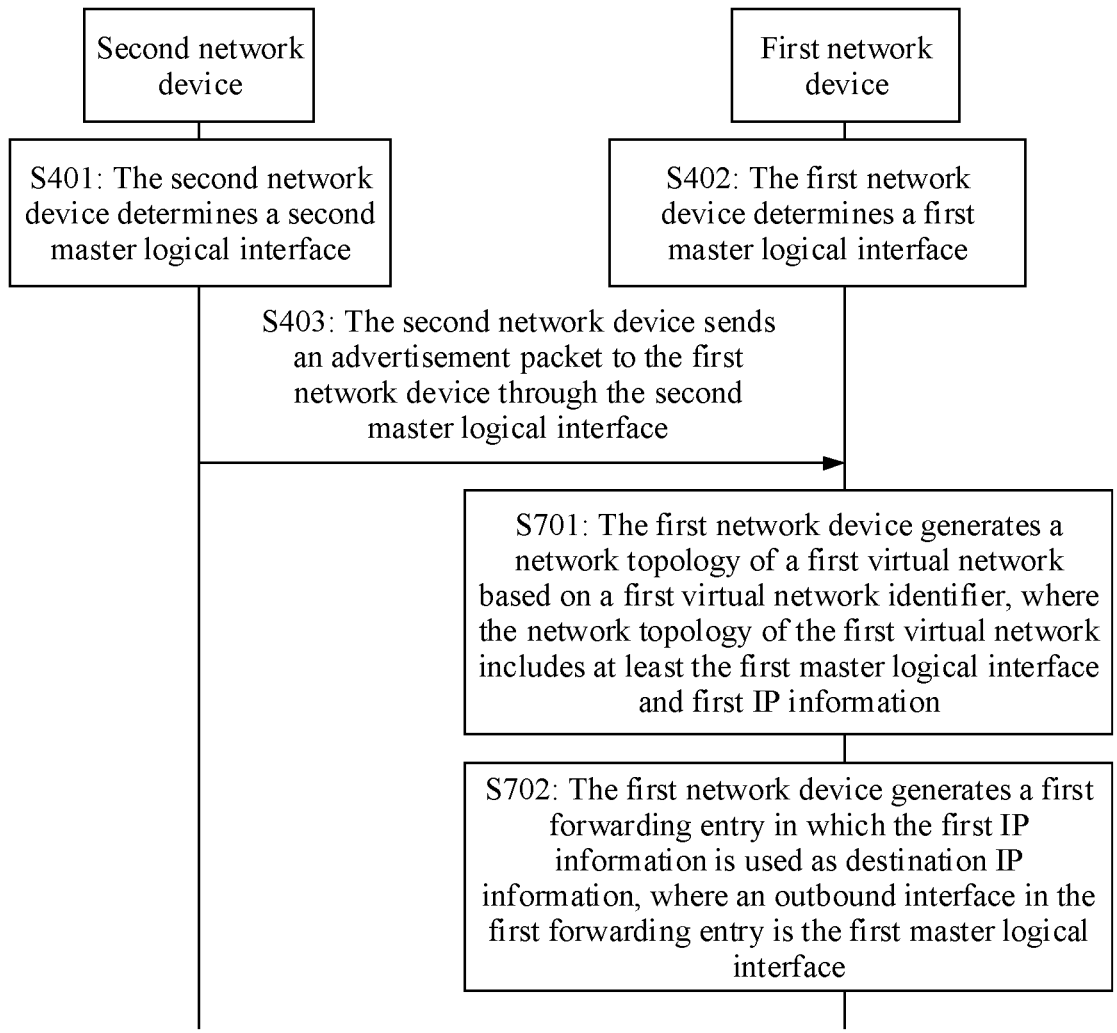
FIG. 7 is an interaction flowchart of a packet transmission method according to still another embodiment of this application.

According to Embodiment 1, as described above, the advertisement packet may further include third link information of the second network device in the first virtual network. Based on this, the first network device may further generate a route forwarding entry based on the third link information. Specifically, FIG. 7 is an interaction flowchart of a packet transmission method according to still another embodiment of this application. As shown in FIG. 7, the method includes the following steps.

Step S701. The first network device generates a network topology of the first virtual network based on the first virtual network identifier, where the network topology of the first virtual network includes at least the first master logical interface and the first IP information.

Step S702. The first network device generates a first forwarding entry in which the first IP information is used as destination IP information, where an outbound interface in the first forwarding entry is the first master logical interface.

Specifically, step S701 includes the first network device determines the first virtual network based on the first virtual network identifier, obtains related link information of the second network device in the first virtual network (including the third link information of the second network device in the first virtual network) and at least one piece of fourth link information of another network device in the first virtual network, and generates the network topology of the first virtual network based on the third link information and the at least one piece of fourth link information. Another network device corresponds to the at least one piece of fourth link information. The first network device may generate the network topology of the first virtual network based on the third link information and the at least one piece of fourth link information in other approaches. Details are not described in this application.

Optionally, in step S702, the first network device calculates a shortest path to another node in the first virtual network based on the collected network topology of the first virtual network, and generates the first forwarding entry in which the first IP information is used as the destination IP information. For example, the outbound interface in the first forwarding entry is the first master logical interface (it is assumed herein that the calculated shortest path from the first network device to the second network device is a path from the first master logical interface to the second master logical interface).

In this embodiment of this application, when the outbound interface obtained through calculation in step S702 is the first master logical interface, because an advertisement packet of the second network device is received through the first master logical interface (that is, a master logical interface) of the first network device, and a virtual interface corresponding to the first virtual network is also the first master logical interface, the first network device generates, for a network topology diagram, a forwarding entry in which the first IP information is used as the destination IP information, and an outbound interface in the forwarding entry is the first master logical interface.

Embodiment 4

According to Embodiment 1, Embodiment 2, or Embodiment 3, as described above, optionally, the advertisement packet is an advertisement packet based on an ISIS protocol. Further, the advertisement packet includes a TLV, and the TLV includes the first virtual network identifier, the second virtual network identifier, a first node-SID of the second network device in the first virtual network, and a second node-SID of the second network device in the second virtual network. The first node-SID corresponds to the first virtual network identifier, and the second node-SID corresponds to the second virtual network identifier. Optionally, the first node-SID includes "End function" of the second network device in the first virtual network, and the second node-SID includes "End function" of the second network device in the second virtual network.

Optionally, the TLV further includes at least one of the following Flags, Func-Flags, an endpoint function value, sizes of the first node-SID and the second node-SID (the sizes of the first node-SID and the second node-SID are the same), at least one sub-TLV, and a sub-TLV-len of all sub-TLV s.

The foregoing fields have been disclosed in other approaches. For details, refer to other approaches. For example, refer to ISIS top-TLV 27 SRv6 Node SID in draft-bashandy-isis-srv6-extensions-02 of the Internet Engineering Task Force (IETF). Details are not described in this application.

It should be noted that the Flags, the Func-Flags, the endpoint function value, the sizes of the first node-SID and the second node-SID, the at least one sub-TLV, and the sub-TLV-len of all the sub-TLVs in the TLV may be used as public fields of node-SIDs corresponding to the first virtual network identifier and the second virtual network identifier. In other words, the first virtual network identifier is the same as the second virtual network identifier in terms of the foregoing fields of the node-SIDs. Therefore, only one set of the foregoing fields need to be configured in one TLV. In this manner, the TLV can be compressed, thereby improving TLV transmission efficiency.

FIG. 8 is a schematic diagram of a TLV according to an embodiment of this application. As shown in FIG. 8, the TLV includes at least one of the following a type, a length, len, a number, Flags, Func-Flags, an endpoint function value, sizes of a first node-SID and a second node-SID (the sizes of the first node-SID and the second node-SID are the same), the first node-SID, the second node-SID, a first virtual network identifier, a second virtual network identifier, at least one sub-TLV, and a sub-TLV-len of all sub-TLVs.

Optionally, the first node-SID includes "End function" of the second network device in the first virtual network, and the second node-SID includes "End function" of the second network device in the second virtual network.

A value of "type" needs to be applied for from the Internet Assigned Numbers Authority (IANA). For example, an ISIS top-level TLV 33 may be applied for, and "type" is described as a set of node-SIDS of a device in a virtual network.

The TLV may include a plurality of Len number modules, and each Len number module starts with Len and "number", where Len means a length (a quantity of bytes) of the module, and "number" means a quantity of node-SIDs. For example, the quantity of node-SIDs is 2 in FIG. 8. These node-SIDs may be written in a same Len number module because Flags, Func-Flags, endpoint function values, SID sizes, and sub-TLVs (if exist) of the node-SIDs are the same.

It should be noted that the type, the length, len, the number, the Flags, the Func-Flags, the endpoint function value, the sizes of the first node-SID and the second node-SID, the at least one sub-TLV, and the sub-TLV-len of all the sub-TLVs included in the TLV may be used as the public fields of the node-SIDs corresponding to the first virtual network identifier and the second virtual network identifier. In other words, the first virtual network identifier is the same as the second virtual network identifier in terms of the foregoing fields of the node-SIDs. Therefore, only one set of the foregoing fields need to be configured in one module of the TLV. In this manner, an advertisement packet length can be compressed, thereby improving advertisement packet transmission efficiency.

It should be noted that, if more virtual networks exist in a network, and public fields are the same, a related node-SID may also be sent in the Len number module of the TLV, and "len" and "number" need to be correspondingly increased. If the public fields are different, the related node-SID may also be sent in the TLV, but a new Len number module needs to be established, where the "len" field represents a byte length in the module, and the "number" field represents a quantity of SIDs in the module. A new set of public fields need to be constructed after the "len" field and the "number" field, and a corresponding quantity of node-SIDs and virtual network identifiers need to be filled. The public fields of these node-SIDs need to be the same. Similarly, if there are more node-SID types, more len number modules can be established.

Embodiment 5

According to Embodiment 1, Embodiment 2, or Embodiment 3, as described above, optionally, the advertisement packet is an advertisement packet based on an ISIS protocol, the advertisement packet includes a TLV, the TLV includes the first virtual network identifier, the second virtual network identifier, a first adjacency-SID that is of the second network device in the first virtual network and that corresponds to the second master logical interface, and a second adjacency-SID that is of the second network device in the second virtual network and that corresponds to the second sub-logical interface. The first adjacency-SID corresponds to the first virtual network identifier, and the second adjacency-SID corresponds to the second virtual network identifier. Optionally, the first adjacency-SID includes "End.X function" that is of the second network device in the first virtual network and that corresponds to the second master logical interface, and the second adjacency-SID includes "End.X function" that is of the second network device in the second virtual network and that corresponds to the second sub-logical interface.

Optionally, the TLV further includes at least one of the following Flags, Func-Flags, an endpoint function value, sizes of the first adjacency-SID and the second adjacency-SID, at least one sub-TLV (optional), and a sub-TLV-len of all sub-TLVs (optional).

The foregoing fields have been disclosed in other approaches. For details, refer to other approaches. For example, refer to SRv6 adjacency-SID sub-TLV and SRv6 LAN adjacency-SID sub-TLV in draft-bashandy-isis-srv6-extensions of the IETF. Details are not described in this application.

It should be noted that the Flags, the Func-Flags, the endpoint function value, the sizes of the first adjacency-SID and the second adjacency-SID (the sizes of the first adjacency-SID and the second adjacency-SID are the same), the at least one sub-TLVs, and the sub-TLV-len of all the sub-TLVs may be used as public fields of adjacency-SIDs corresponding to the first virtual network identifier and the second virtual network identifier. In other words, the first virtual network identifier is the same as the second virtual network identifier in terms of the foregoing fields of the adjacency-SIDs. Therefore, only one set of the foregoing fields need to be configured in one TLV. In this manner, the TLV can be compressed, thereby improving TLV transmission efficiency.

FIG. 9 is a schematic diagram of a TLV according to an embodiment of this application. The TLV is applied to a point-to-point (P2P) adjacency relationship. As shown in FIG. 9, the TLV includes a type, a length, a layer 3 neighbor system ID and pseudonode number, a module length (len), a number, Flags, Func-Flags, an endpoint function value, sizes of a first adjacency-SID and a second adjacency-SID (the sizes of the first adjacency-SID and the second adjacency-SID are the same), the first adjacency-SID, the second adjacency-SID, a first virtual network identifier, a second virtual network identifier, at least one sub-TLV (optional), and a sub-TLV-len of all sub-TLVs (optional).

Optionally, the first adjacency-SID includes "End.X function" of the second network device in the first virtual network, and the second adjacency-SID includes "End.X function" of the second network device in the second virtual network.

Optionally, the sub-TLVs include metric1 and bandwidth information that are of the second master logical interface corresponding to the first virtual network, and metric2 and bandwidth information that are of the second sub-logical interface corresponding to the second virtual network. For example, it is specified that a new metric list sub-TLV carries two pieces of metric information, and a new bandwidth list sub-TLV carries two pieces of bandwidth information. A value arrangement sequence in either of the metric list and the bandwidth list corresponds to an adjacency-SID arrangement sequence. In other words, a sequence in which the adjacency-SID of the second master logical interface corresponding to the first virtual network is arranged in the adjacency-SID list is the same as a sequence in which a metric or a bandwidth of the second master logical interface corresponding to the first virtual network is arranged in the metric list or the bandwidth list. The two TLVs may be selectively carried, and may be carried only when the "endpoint function value" field is a value corresponding to an End.X function.

A value of "type" needs to be applied for from the IANA. For example, an ISIS top-level TLV 34 may be applied for, and "type" is described as a set of adjacency-SIDs of a device in a sliced network.

For information about the layer 3 neighbor system ID and pseudonode number, refer to content in an RFC3784 Extended Intermediate System (IS) reachability TLV in which a value of "type" is 22.

The TLV may include a plurality of Len number modules, and each Len number module starts with Len and "number", where Len means a length (a quantity of bytes) of the module, and "number" means a quantity of adjacency-SIDs. For example, the quantity of adjacency-SIDs is 2 in FIG. 9. These adjacency-SIDs may be written in a same Len number module because Flags, Func-Flags, endpoint function values, SID sizes, and sub-TLVs (if exist) of the adjacency-SIDs are the same.

It should be noted the type, the length, the system ID and pseudonode number, len, the number, the Flags, the Func-Flags, the endpoint function value, the sizes of the first adjacency-SID and the second adjacency-SID, the at least one sub-TLV, and the sub-TLV-len of all the sub-TLVs included in the TLV may be used as the public fields of the adjacency-SIDs corresponding to the first virtual network identifier and the second virtual network identifier. In other words, the first virtual network identifier is the same as the second virtual network identifier in terms of the foregoing fields of the adjacency-SIDs. Therefore, only one set of foregoing fields need to be configured in one Len number module of the TLV. In this manner, an advertisement packet can be compressed, thereby improving advertisement packet transmission efficiency.

It should be noted that, if more virtual networks exist in a network, and public fields are the same, a related adjacency-SID may also be sent in the Len number module of the TLV, and "len" and "number" need to be correspondingly increased. If the public fields are different, the related adjacency-SID may also be sent in the TLV, but a new Len number module needs to be established, where the "len" field represents a byte length in the Len number module, and the "number" field represents a quantity of SIDs in the module. A new set of public fields need to be constructed after the "len" field and the "number" field, and a corresponding quantity of adjacency-SIDs and virtual network identifiers need to be filled. The public fields of these adjacency SIDs need to be the same. Similarly, if there are more adjacency-SID types, more Len number modules can be established.

FIG. 10 is a schematic diagram of a TLV according to an embodiment of this application. The TLV is applied to a local area network (LAN) connection adjacency relationship. As shown in FIG. 10, the TLV includes at least one of the following a type, a length, a layer 3 neighbor system ID and pseudonode number, len, a number, a neighbor system ID, Flags, Func-Flags, an endpoint function value, sizes of a first adjacency-SID and a second adjacency-SID (the sizes of the first adjacency-SID and the second adjacency-SID are the same), a first adjacency-SID, the second adjacency-SID, the first virtual network identifier, a second virtual network identifier, at least one sub-TLV, and a sub-TLV-len of all sub-TLVs.

Optionally, the first adjacency-SID includes "End.X function" of the second network device in the first virtual network, and the second adjacency-SID includes "End.X function" of the second network device in the second virtual network.

Optionally, the sub-TLVs include metric1 and bandwidth information that are of the second master logical interface corresponding to the first virtual network, and metric2 and bandwidth information that are of the second sub-logical interface corresponding to the second virtual network. For example, it is specified that a new metric list sub-TLV carries two pieces of metric information, and a new bandwidth list sub-TLV carries two pieces of bandwidth information. A value arrangement sequence in either of the metric list and the bandwidth list corresponds to an adjacency-SID arrangement sequence. In other words, a sequence in which the adjacency-SID of the second master logical interface corresponding to the first virtual network is arranged in the adjacency-SID list is the same as a sequence in which a metric or a bandwidth of the second master logical interface corresponding to the first virtual network is arranged in the metric list or the bandwidth list. The two TLVs may be selectively carried, and may be carried only when the "endpoint function value" field is a value corresponding to an End.X function.

A value of "type" needs to be applied for from the IANA. For example, an ISIS top-level TLV 35 may be applied for, and "type" is described as a set of LAN adjacency-SIDs of a device in a sliced network.

For information about the layer 3 neighbor system ID and pseudonode number, refer to content in an RFC3784 Extended IS reachability TLV in which a value of "type" is 22.

The neighbor system ID is a system ID of a remote node on a link, and indicates a neighbor of a node in a physical network.

The TLV may include a plurality of Len number modules, and each module starts with Len and "number", where Len means a length (a quantity of bytes) of the Len number module, and "number" means a quantity of adjacency-SIDs. For example, the quantity of adjacency-SIDs is 2 in FIG. 10. These adjacency SIDs may be written in a same Len number module because system IDs, Flags, Func-Flags, endpoint function values, SID sizes, and sub-TLVs (if exist) of the adjacency-SIDs are the same.

It should be noted that the type, the length, the system ID and pseudonode number, len, the number, the system ID, the Flags, the Func-Flags, the endpoint function value, the sizes of the first adjacency-SID and the second adjacency-SID, the at least one sub-TLV, and the sub-TLV-len of all the sub-TLVs included in the TLV may be used as the public fields of the adjacency-SIDs corresponding to the first virtual network identifier and the second virtual network identifier. In other words, the first virtual network identifier is the same as the second virtual network identifier in terms of the foregoing fields of the adjacency-SIDs. Therefore, only one set of the foregoing fields need to be configured in one TLV. In this manner, the TLV can be compressed, thereby improving TLV transmission efficiency. It should be noted that, if more virtual networks exist in a network, and public fields are the same, a related adjacency-SID may also be sent in the Len number module of the TLV, and "len" and "number" need to be correspondingly increased. If the public fields are different, the related adjacency-SID may also be sent in the TLV, but a new Len number module needs to be established, where the "len" field represents a byte length in the Len number module, and the "number" field represents a quantity of SIDs in the module. A new set of public fields need to be constructed after the "len" field and the "number" field, and a corresponding quantity of adjacency-SIDs and virtual network identifiers need to be filled. The public fields of these adjacency SIDs need to be the same. Similarly, if there are more adjacency-SID types, more Len number modules can be established.

Embodiment 6

Figure 11A:
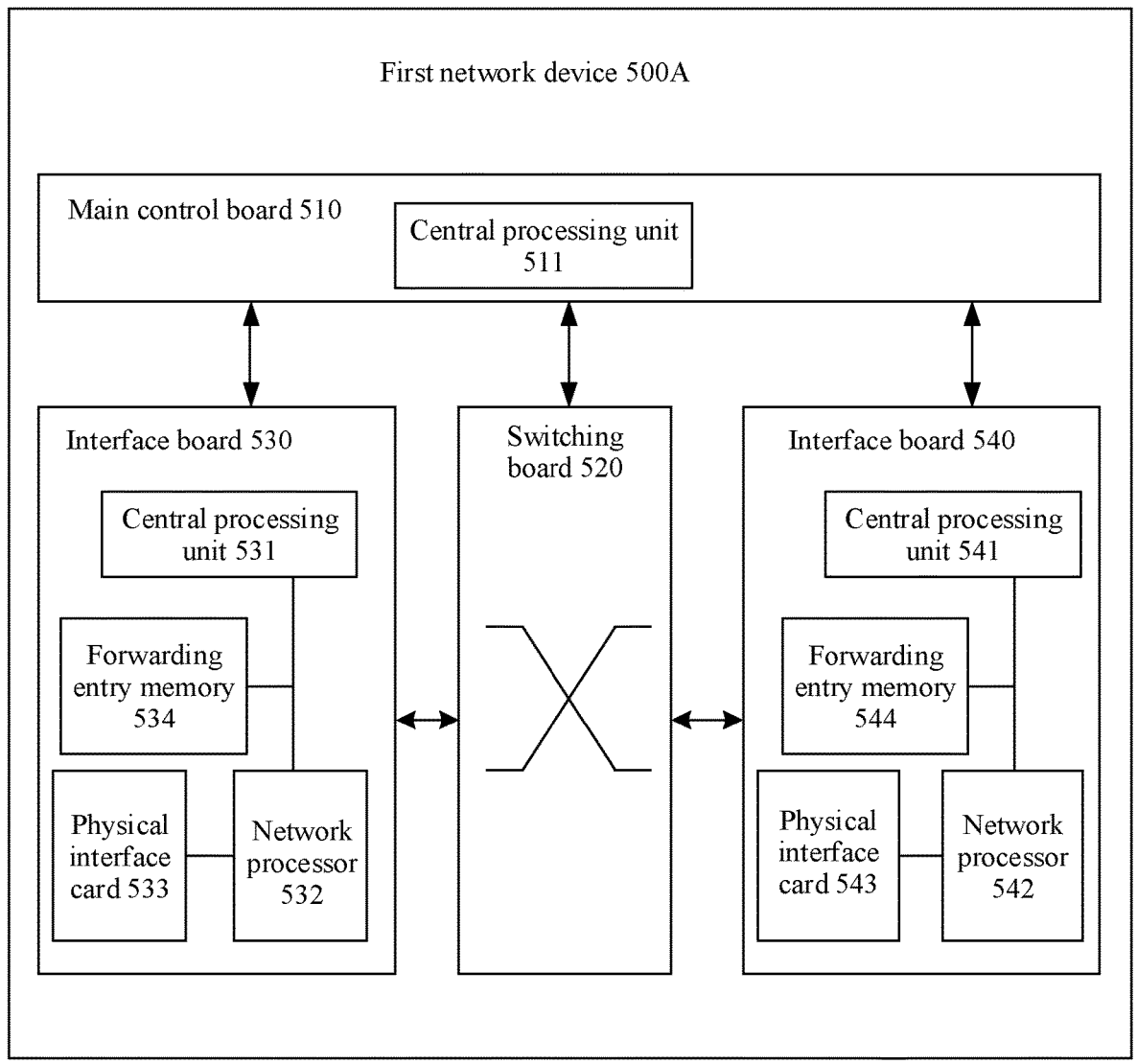
FIG. 11A is a possible schematic structural diagram of a first network device in the foregoing embodiments.

FIG. 11A is a possible schematic structural diagram of a first network device in the foregoing embodiments. A first network device 500A includes a main control board 510, an interface board 530, a switching board 520, and an interface board 540. The main control board 510 is configured to complete functions such as system management, device maintenance, and protocol processing. The switching board 520 is configured to exchange data between various interface boards (the interface board is also referred to as a line card or a service board). The interface board 530 and the interface board 540 are configured to provide various service interfaces (for example, an Ethernet interface and a point-of-sale (POS) interface), and implement data packet forwarding. The main control board 510, the interface board 530, the interface board 540, and the switching board 520 are connected to a platform backboard by using a system bus, so as to implement interworking. A central processing unit (CPU) 531 on the interface board 530 is configured to control and manage the interface board, and communicate with a CPU 511 on the main control board 510.

The CPU 511 determines a first master logical interface, where the first master logical interface is associated with a first virtual network identifier and a first sub-logical interface, the first sub-logical interface is associated with a second virtual network identifier, the first virtual network identifier is used to identify a first virtual network, and the second virtual network identifier is used to identify a second virtual network. The first network device 500A receives an advertisement packet of a second network device from a physical interface card 533, where the advertisement packet includes the first virtual network identifier, first IP information associated with the first virtual network identifier, the second virtual network identifier, and second IP information associated with the second virtual network identifier, the first IP information is IP information of the second network device in the first virtual network, and the second IP information is IP information of the second network device in the second virtual network. The physical interface card 533 sends the advertisement packet to a network processor 532, and the network processor 532 searches for a forwarding entry memory 534 based on a destination address (which is a local IP address of the first network device) in the advertisement packet. A local packet is indicated in a matching result. Therefore, the network processor 532 sends the advertisement packet to the CPU 511 of a control plane.

The CPU 511 specifically performs some method steps related to the first network device. The physical interface card 533 and the network processor 532 specifically perform some method steps related to the first network device. For details, refer to the foregoing related descriptions. Details are not described herein again.

It should be understood that, in this embodiment of the present disclosure, an operation on the interface board 540 is consistent with an operation on the interface board 530. For brevity, details are not described again. It should be understood that the first network device 500A in this embodiment of the present disclosure may correspond to the first network device in the foregoing method embodiment. In addition, the modules in the first network device 500A and the foregoing other operations and/or functions are separately used to implement the steps and methods implemented by the foregoing first network device. For brevity, details are not described herein again.

It should be noted that, there may be one or more main control boards. When there are a plurality of main control boards, the main control boards may include an active main control board and a standby main control board. There may be one or more interface boards. The first network device having a stronger data processing capability provides more interface boards. There may also be one or more physical interface cards on the interface board. There may be no switching board, or one or more switching boards. When there are a plurality of switching boards, load sharing and redundancy backup may be implemented together. In a centralized forwarding architecture, the first network device may need no switching board, and the interface board provides a function of processing service data in an entire system. In a distributed forwarding architecture, the first network device may have at least one switching board, and exchange data between a plurality of interface boards by using the switching board, to provide a large-capacity data exchange and processing capability. Therefore, a data access and processing capability of the first network device of a distributed architecture is better than that of the device of a centralized architecture. Optionally, the first network device 500A in another form may have only one card. In other words, there is no switching board, and functions of an interface board and a main control board are integrated into the card. In this case, a CPU on the interface board and a CPU on the main control board may be combined into one CPU on the card, to perform functions generated after the two CPUs are combined. A device in this form (for example, a network device such as a low-end switch or router) has a relatively weak data exchange and processing capability. Which architecture is specifically used depends on a specific networking deployment scenario, and no limitation is imposed herein.

Embodiment 7

Figure 11B:
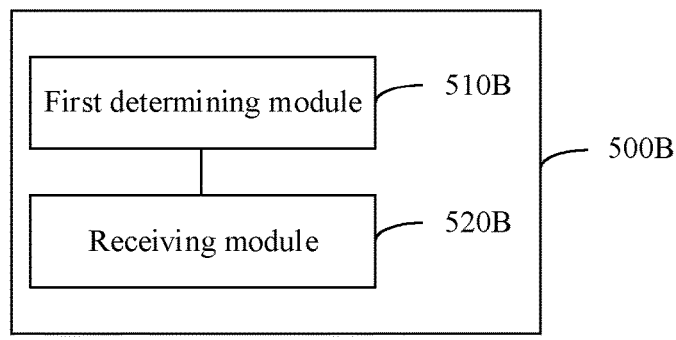
FIG. 11B is another possible schematic structural diagram of a first network device in the foregoing embodiments.

FIG. 11B is another possible schematic structural diagram of a first network device in the foregoing embodiments. A first network device 500B includes a first determining module 510B and a receiving module 520B.

The determining module 510B is configured to determine a first master logical interface, where the first master logical interface is associated with a first virtual network identifier and a first sub-logical interface, the first sub-logical interface is associated with a second virtual network identifier, the first virtual network identifier is used to identify a first virtual network, and the second virtual network identifier is used to identify a second virtual network. The receiving module 520B is configured to receive an advertisement packet from a second network device through the first master logical interface, where the advertisement packet includes the first virtual network identifier, first IP information associated with the first virtual network identifier, the second virtual network identifier, and second IP information associated with the second virtual network identifier, the first IP information is IP information of the second network device in the first virtual network, and the second IP information is IP information of the second network device in the second virtual network.

Optionally, the first network device 500B further includes a first generation module, configured to generate a network topology of the second virtual network based on the second virtual network identifier, where the network topology of the second virtual network includes the first master logical interface and the second IP information, a second generation module, configured to generate a second forwarding entry in which the second IP information is used as destination IP information, where an outbound interface in the second forwarding entry is the first master logical interface, a second determining module, configured to determine the first sub-logical interface based on the first master logical interface and the second virtual network identifier, and a replacement module, configured to replace the first master logical interface in the second forwarding entry with the first sub-logical interface.

Optionally, the apparatus further includes further includes a third generation module, configured to generate a network topology of the first virtual network based on the first virtual network identifier, where the network topology of the first virtual network includes the first master logical interface and the first IP information, and a fourth generation module, configured to generate a first forwarding entry in which the first IP information is used as destination IP information, where an outbound interface in the first forwarding entry is the first master logical interface.

Optionally, the apparatus further includes further includes a configuration module, configured to configure the first master logical interface and the first sub-logical interface, configure the first sub-logical interface as a slave interface of the first master logical interface, and establish an association relationship between the first sub-logical interface and the second virtual network identifier and an association relationship between the first master logical interface, the first virtual network identifier, and the second virtual network identifier.

Optionally, the advertisement packet is an advertisement packet based on an ISIS protocol, the advertisement packet includes a TLV, and the TLV includes the first virtual network identifier, the second virtual network identifier, a first node-SID of the second network device in the first virtual network, and a second node-SID of the second network device in the second virtual network. The first node-SID corresponds to the first virtual network identifier, and the second node-SID corresponds to the second virtual network identifier.

Optionally, the TLV further includes at least one of the following Flags, Func-Flags, an endpoint function value, sizes of the first node-SID and the second node-SID, at least one sub-TLV, and a sub-TLV-len of all sub-TLVs.

Optionally, the advertisement packet is an advertisement packet based on an ISIS protocol, the advertisement packet includes a TLV, and the TLV includes the first virtual network identifier, the second virtual network identifier, a first adjacency-SID of the second network device in the first virtual network, and a second adjacency-SID of the second network device in the second virtual network. The first adjacency-SID corresponds to the first virtual network identifier, and the second adjacency-SID corresponds to the second virtual network identifier.

Optionally, the TLV further includes at least one of the following Flags, Func-Flags, an endpoint function value, sizes of the first adjacency-SID and the second adjacency-SID, at least one sub-TLVs, and a sub-TLV-len of all sub-TLVs.

It should be understood that the first network device 500B in this embodiment of this application may correspond to the first network device in the foregoing method embodiment. In addition, the modules in the first network device 500B and the foregoing other operations and/or functions are separately used to implement the steps and methods implemented by the foregoing first network device. For brevity, details are not described herein again.

Embodiment 8

Figure 11C:
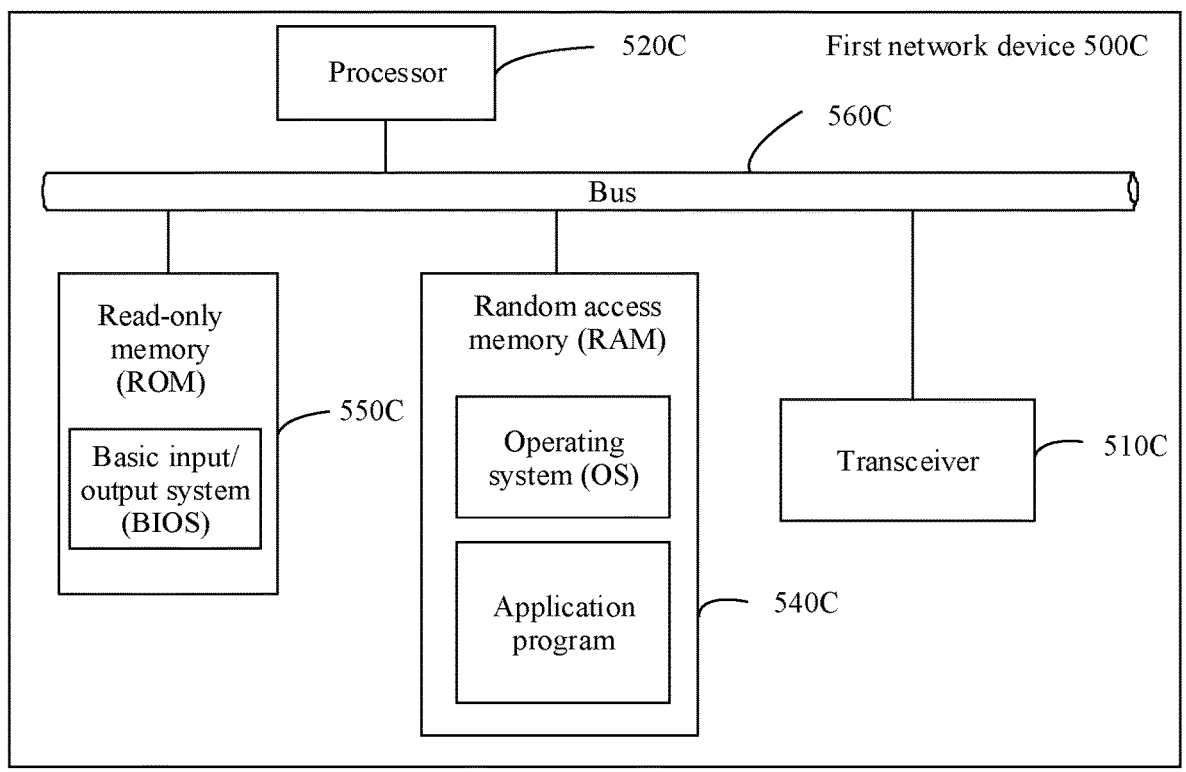
FIG. 11C is a possible schematic structural diagram of a first network device in the foregoing embodiments.

FIG. 11C is a possible schematic structural diagram of a first network device in the foregoing embodiments. A first network device 500C includes a transceiver 510C, a processor 520C, a random-access memory (RAM) 540C, a read-only memory (ROM) 550C, and a bus 560C. The processor 520C is separately coupled to the transceiver 510C, the RAM 540C, and the ROM 550C by using the bus 560C. When the first network device 500C needs to run, the first network device 500C is started by using a basic input/output system built into the ROM 550C or a bootloader system in an embedded system, to boot the first network device 500C to enter a normal running state. After the first network device 500C enters the normal running state, an application program and an operating system run in the RAM 540C, so that the following operations are performed.

The processor 520C is configured to determine a first master logical interface, where the first master logical interface is associated with a first virtual network identifier and a first sub-logical interface, the first sub-logical interface is associated with a second virtual network identifier, the first virtual network identifier is used to identify a first virtual network, and the second virtual network identifier is used to identify a second virtual network.

The transceiver 510C is configured to receive an advertisement packet from a second network device through the first master logical interface, where the advertisement packet includes the first virtual network identifier, first IP information associated with the first virtual network identifier, the second virtual network identifier, and second IP information associated with the second virtual network identifier, the first IP information is IP information of the second network device in the first virtual network, and the second IP information is IP information of the second network device in the second virtual network.

The processor 520C is further configured to generate a network topology of the second virtual network based on the second virtual network identifier, where the network topology of the second virtual network includes the first master logical interface and the second IP information, generate a second forwarding entry in which the second IP information is used as destination IP information, where an outbound interface in the second forwarding entry is the first master logical interface, determine the first sub-logical interface based on the first master logical interface and the second virtual network identifier, and replace the first master logical interface in the second forwarding entry with the first sub-logical interface.

The processor 520C is further configured to generate a network topology of the first virtual network based on the first virtual network identifier, where the topology of the first virtual network includes the first master logical interface and the first IP information, and generate a first forwarding entry in which the first IP information is used as destination IP information, where an outbound interface in the first forwarding entry is the first master logical interface.

The processor 520C is further configured to configure the first master logical interface and the first sub-logical interface, configure the first sub-logical interface as a slave interface of the first master logical interface, and establish an association relationship between the first sub-logical interface and the second virtual network identifier and an association relationship between the first master logical interface, the first virtual network identifier, and the second virtual network identifier.

Optionally, the advertisement packet is an advertisement packet based on an ISIS protocol, the advertisement packet includes a TLV, and the TLV includes the first virtual network identifier, the second virtual network identifier, a first node-SID of the second network device in the first virtual network, and a second node-SID of the second network device in the second virtual network. The first node-SID corresponds to the first virtual network identifier, and the second node-SID corresponds to the second virtual network identifier.

Optionally, the TLV further includes at least one of the following Flags, Func-Flags, an endpoint function value, sizes of the first node-SID and the second node-SID, at least one sub-TLV, and a sub-TLV-len of all sub-TLVs.

Optionally, the advertisement packet is an advertisement packet based on an ISIS protocol, the advertisement packet includes a TLV, and the TLV includes the first virtual network identifier, the second virtual network identifier, a first adjacency-SID of the second network device in the first virtual network, and a second adjacency-SID of the second network device in the second virtual network. The first adjacency-SID corresponds to the first virtual network identifier, and the second adjacency-SID corresponds to the second virtual network identifier.

Optionally, the TLV further includes at least one of the following Flags, Func-Flags, an endpoint function value, sizes of the first adjacency-SID and the second adjacency-SID, at least one sub-TLVs, and a sub-TLV-len of all sub-TLVs.

It should be understood that the first network device 500C in this embodiment of this application may correspond to the first network device in the foregoing method embodiment. In addition, the modules in the first network device 500C and the foregoing other operations and/or functions are separately used to implement the steps and methods implemented by the foregoing first network device. For brevity, details are not described herein again.

It should be noted that, in this embodiment, the first network device may alternatively be implemented based on a general physical server with reference to a network functions virtualization (NFV) technology, and the first network device is a virtual first network device (for example, a virtual host, a virtual router, or a virtual switch). The virtual first network device may be a virtual machine (VM) on which a program used for generating a network slice is run, and the VM is deployed on a hardware device (for example, a physical server). The VM is a complete computer system that is simulated by software, that has a complete hardware system function, and that runs in an isolated environment. After reading this application, with reference to the NFV technology, a person skilled in the art may virtualize, on the general physical server, a plurality of first network devices having the foregoing functions. Details are not described herein.

Embodiment 9

Figure 12A:
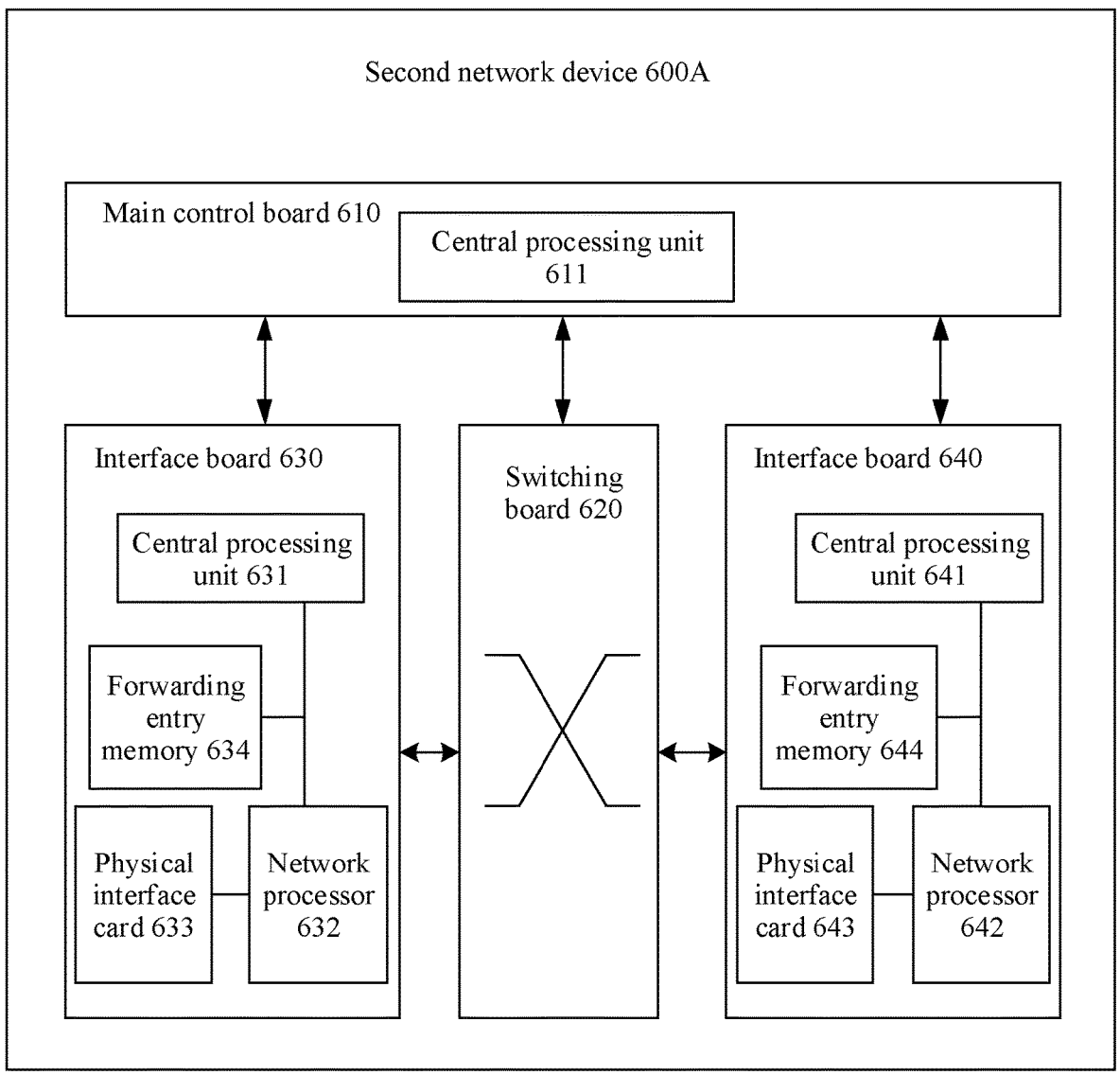
FIG. 12A is a possible schematic structural diagram of a second network device in the foregoing embodiments.

FIG. 12A is a possible schematic structural diagram of a second network device in the foregoing embodiments. A second network device 600A includes a main control board 610, an interface board 630, a switching board 620, and an interface board 640. The main control board 610 is configured to complete functions such as system management, device maintenance, and protocol processing. The switching board 620 is configured to exchange data between various interface boards (the interface board is also referred to as a line card or a service board). The interface board 630 and the interface board 640 are configured to provide various service interfaces (for example, an Ethernet interface and a POS interface), and implement data packet forwarding. The main control board 610, the interface board 630, the interface board 640, and the switching board 620 are connected to a platform backboard by using a system bus, so as to implement interworking. A CPU 631 on the interface board 630 is configured to control and manage the interface board, and communicate with a CPU 611 on the main control board 610.

The CPU 611 on the main control board 610 is configured to determine a second master logical interface, where the second master logical interface is associated with a first virtual network identifier and a second sub-logical interface, the second sub-logical interface is associated with a second virtual network identifier, the first virtual network identifier is used to identify a first virtual network, and the second virtual network identifier is used to identify a second virtual network. The CPU 611 is further configured to generate an advertisement packet, where the advertisement packet includes the first virtual network identifier, first IP information corresponding to the first virtual network identifier, the second virtual network identifier, and second IP information corresponding to the second virtual network identifier, the first IP information is IP information of the second network device in the first virtual network, and the second IP information is IP information of the second network device in the second virtual network, and deliver the advertisement packet to a network processor 632 by using the CPU 631.

The network processor 632 sends, based on that a destination address of the advertisement packet includes a broadcast address in the first virtual network and a broadcast address in the second virtual network, the advertisement packet to all corresponding physical interface cards that belong to the first virtual network and the second virtual network. The network processor 632 sends the advertisement packet to a physical interface card 633, and the physical interface card 633 sends the advertisement packet to a first network device.

The CPU 611 specifically performs some method steps related to the foregoing second network device. The physical interface card 633 and the network processor 632 specifically perform some method steps related to the foregoing second network device. For details, refer to the foregoing related descriptions. Details are not described herein again.

It should be understood that, in this embodiment of the present disclosure, an operation on the interface board 640 is consistent with an operation on the interface board 630. For brevity, details are not described again. It should be understood that the second network device 600A in this embodiment of the present disclosure may correspond to the second network device in the foregoing method embodiment. In addition, the modules in the second network device 600A and the foregoing other operations and/or functions are separately used to implement the steps and methods implemented by the foregoing second network device in the embodiments corresponding to FIG. 1 to FIG. 7. For brevity, details are not described herein again.

It should be noted that, there may be one or more main control boards. When there are a plurality of main control boards, the main control boards may include an active main control board and a standby main control board. There may be one or more interface boards. The second network device having a stronger data processing capability provides more interface boards. There may also be one or more physical interface cards on the interface board. There may be no switching board, or one or more switching boards. When there are a plurality of switching boards, load sharing and redundancy backup may be implemented together. In a centralized forwarding architecture, the second network device may need no switching board, and the interface board provides a function of processing service data in an entire system. In a distributed forwarding architecture, the second network device may have at least one switching board, and exchange data between a plurality of interface boards by using the switching board, to provide a large-capacity data exchange and processing capability. Therefore, a data access and processing capability of the second network device of a distributed architecture is better than that of the device of a centralized architecture. Optionally, the second network device 600A in another form may have only one card. In other words, there is no switching board, and functions of an interface board and a main control board are integrated into the card. In this case, a CPU on the interface board and a CPU on the main control board may be combined into one CPU on the card, to perform functions generated after the two CPUs are combined. A device in this form (for example, a network device such as a low-end switch or router) has a relatively weak data exchange and processing capability. Which architecture is specifically used depends on a specific networking deployment scenario, and no limitation is imposed herein.

Embodiment 10

Figure 12B:
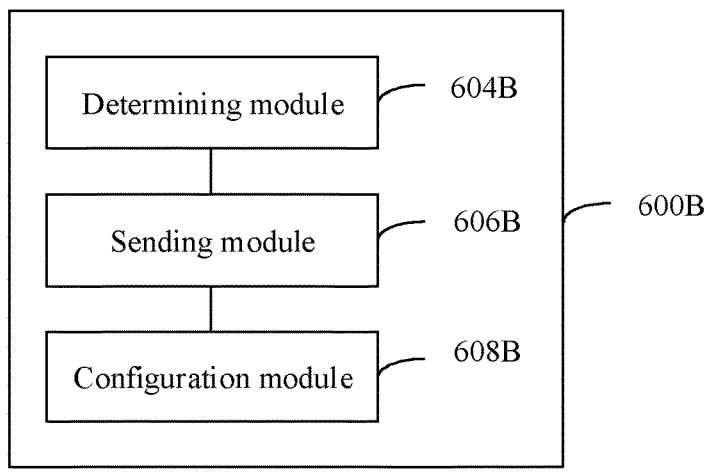
FIG. 12B is another possible schematic structural diagram of a second network device in the foregoing embodiments.

FIG. 12B is another possible schematic structural diagram of a second network device in the foregoing embodiments. A second network device 600B includes a determining module 604B and a sending module 606B.

The determining module 604B is configured to determine a second master logical interface, where the second master logical interface is associated with a first virtual network identifier and a second sub-logical interface, the second sub-logical interface is associated with a second virtual network identifier, the first virtual network identifier is used to identify a first virtual network, and the second virtual network identifier is used to identify a second virtual network.

The sending module 606B is configured to send an advertisement packet to a first network device through the second master logical interface, where the advertisement packet includes the first virtual network identifier, first IP information corresponding to the first virtual network identifier, the second virtual network identifier, and second IP information corresponding to the second virtual network identifier, the first IP information is IP information of the second network device in the first virtual network, and the second IP information is IP information of the second network device in the second virtual network.

Optionally, the second network device further includes a configuration module 608B. The configuration module 608B is configured to configure the second master logical interface and the second sub-logical interface, configure the second sub-logical interface as a slave interface of the second master logical interface, and establish an association relationship between the second sub-logical interface and the second virtual network identifier and an association between the second master logical interface, the first virtual network identifier, and the second virtual network identifier.

Optionally, the advertisement packet is an advertisement packet based on an ISIS protocol, the advertisement packet includes a TLV, and the TLV includes the first virtual network identifier, the second virtual network identifier, a first node-SID of the second network device in the first virtual network, and a second node-SID of the second network device in the second virtual network. The first node-SID corresponds to the first virtual network identifier, and the second node-SID corresponds to the second virtual network identifier.

Optionally, the TLV further includes at least one of the following Flags, Func-Flags, an endpoint function value, sizes of the first node-SID and the second node-SID, at least one sub-TLV, and a sub-TLV-len of all sub-TLVs.

Optionally, the advertisement packet is an advertisement packet based on an ISIS protocol, the advertisement packet includes a TLV, and the TLV includes the first virtual network identifier, the second virtual network identifier, a first adjacency-SID of the second network device in the first virtual network, and a second adjacency-SID of the second network device in the second virtual network. The first adjacency-SID corresponds to the first virtual network identifier, and the second adjacency-SID corresponds to the second virtual network identifier.

Optionally, the TLV further includes at least one of the following Flags, Func-Flags, an endpoint function value, sizes of the first adjacency-SID and the second adjacency-SID, at least one sub-TLV, and a sub-TLV-len of all sub-TLVs.

It should be understood that the second network device 600B in this embodiment of this application may correspond to the second network device in the foregoing method embodiment. In addition, the modules in the second network device 600B and the foregoing other operations and/or functions are separately used to implement the steps and methods implemented by the foregoing second network device. For brevity, details are not described herein again.

Embodiment 11

Figure 12C:
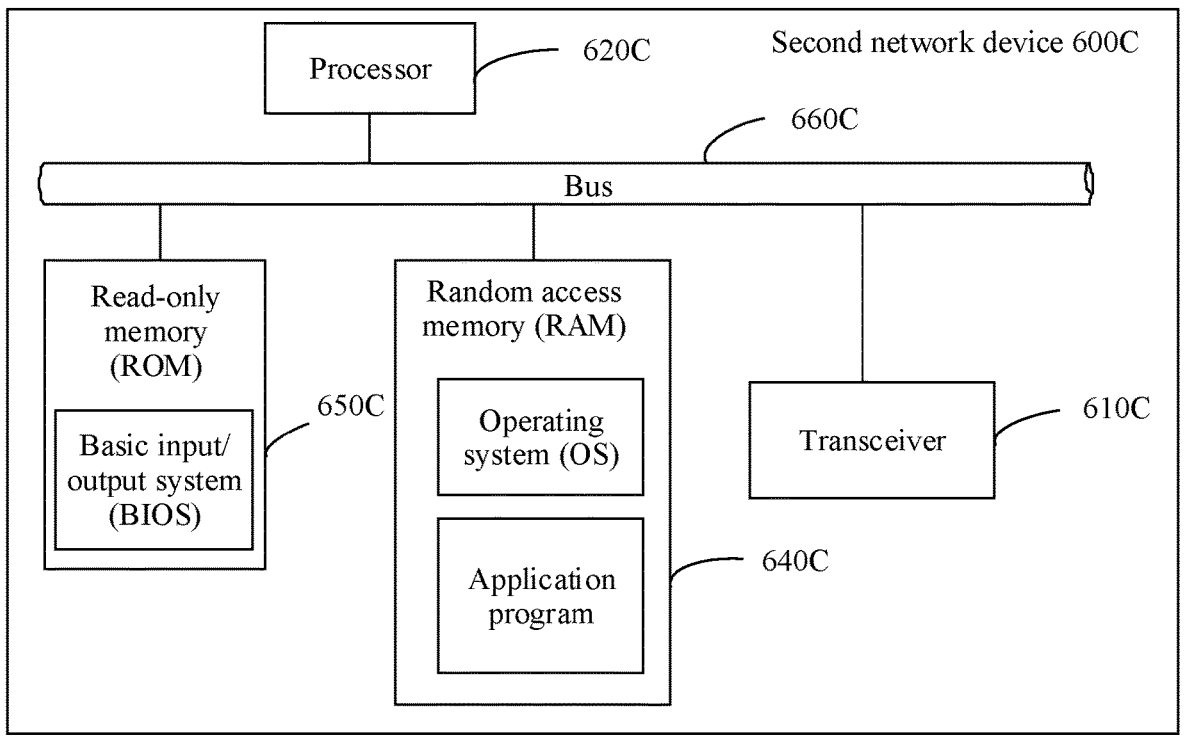
FIG. 12C is a possible schematic structural diagram of a second network device in the foregoing embodiments.

FIG. 12C is a possible schematic structural diagram of a second network device in the foregoing embodiments. A second network device 600C includes a transceiver 610C, a processor 620C, a RAM 640C, a ROM 650C, and a bus 660C. The processor 620C is separately coupled to the transceiver 610C, the RAM 640C, and the ROM 650C by using the bus 660C. When the second network device 600C needs to run, the second network device 600C is started by using a basic input/output system built into the ROM 650C or a bootloader system in an embedded system, to boot the second network device 600C to enter a normal running state. After the second network device 600C enters the normal running state, an application program and an operating system run in the RAM 640C, so that the following operations are performed.

The processor 620C determines a second master logical interface, where the second master logical interface is associated with a first virtual network identifier and a second sub-logical interface, the second sub-logical interface is associated with a second virtual network identifier, the first virtual network identifier is used to identify a first virtual network, and the second virtual network identifier is used to identify a second virtual network.

The transceiver 610C sends an advertisement packet to a first network device through the second master logical interface, where the advertisement packet includes the first virtual network identifier, first IP information corresponding to the first virtual network identifier, the second virtual network identifier, and second IP information corresponding to the second virtual network identifier, the first IP information is IP information of the second network device in the first virtual network, and the second IP information is IP information of the second network device in the second virtual network.

The processor 620C configures the second master logical interface and the second sub-logical interface, configures the second sub-logical interface as a slave interface of the second master logical interface, and establishes an association relationship between the second sub-logical interface and the second virtual network identifier and an association relationship between the second master logical interface, the first virtual network identifier, and the second virtual network identifier.

The advertisement packet is an advertisement packet based on an ISIS protocol, the advertisement packet includes a TLV, and the TLV includes the first virtual network identifier, the second virtual network identifier, a first node-SID of the second network device in the first virtual network, and a second node-SID of the second network device in the second virtual network. The first node-SID corresponds to the first virtual network identifier, and the second node-SID corresponds to the second virtual network identifier.

The TLV further includes at least one of the following Flags, Func-Flags, an endpoint function value, sizes of the first node-SID and the second node-SID, at least one sub-TLV, and a sub-TLV-len of all sub-TLVs.

The advertisement packet is an advertisement packet based on an ISIS protocol, the advertisement packet includes a TLV, and the TLV includes the first virtual network identifier, the second virtual network identifier, a first adjacency-SID of the second network device in the first virtual network, and a second adjacency-SID of the second network device in the second virtual network. The first adjacency-SID corresponds to the first virtual network identifier, and the second adjacency-SID corresponds to the second virtual network identifier.

The TLV further includes at least one of the following Flags, Func-Flags, an endpoint function value, sizes of the first adjacency-SID and the second adjacency-SID, at least one sub-TLV, and a sub-TLV-len of all sub-TLVs.

It should be understood that the second network device 600C in this embodiment of this application may correspond to the second network device in the foregoing method embodiment. In addition, the modules in the second network device 600C and the foregoing other operations and/or functions are separately used to implement the steps and methods implemented by the foregoing second network device. For brevity, details are not described herein again.

It should be noted that, in this embodiment, the second network device may alternatively be implemented based on a general physical server with reference to a NFV technology, and the second network device is a virtual second network device (for example, a virtual host, a virtual router, or a virtual switch). The virtual second network device may be a VM on which a program used for sending an advertisement packet is run, and the VM is deployed on a hardware device (for example, a physical server). The VM is a complete computer system that is simulated by software, that has a complete hardware system function, and that runs in an isolated environment. After reading this application, with reference to the NFV technology, a person skilled in the art may virtualize, on the general physical server, a plurality of second network devices having the foregoing functions. Details are not described herein.

Embodiment 12

Figure 13:
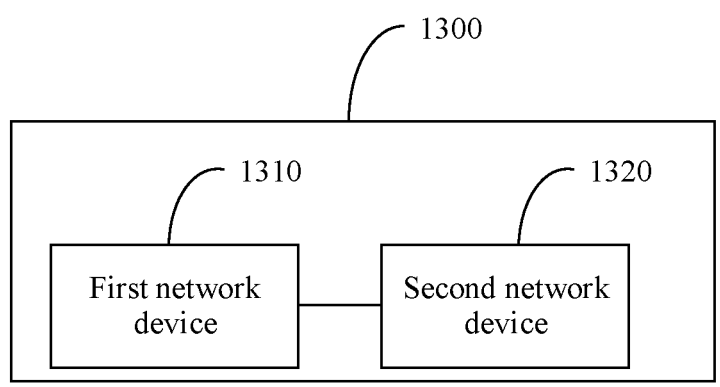
FIG. 13 is a schematic diagram of a packet transmission system according to an embodiment of this application.

FIG. 13 is a schematic diagram of a packet transmission system according to an embodiment of this application. As shown in FIG. 13, A system 1300 includes a first network device 1310 and a second network device 1320. The first network device 1310 is any first network device described in FIG. 11A, FIG. 11B, and FIG. 11C, or a virtual first network device. The second network device 1320 is any second network device described in FIG. 12A, FIG. 12B, and FIG. 12C, or a virtual second network device. For detailed descriptions about the devices in the system, refer to related embodiments in FIG. 11A to FIG. 11C, FIG. 12A to FIG. 12C, and the like. Details are not described herein again.

It should be understood that a person skilled in the art can obtain, on a basis of reading this application, combinations of optional features, steps, or methods described in the embodiments in this application without creative efforts, and all of the combinations belong to the embodiments disclosed in this application. For simple descriptions or writing, different combinations are not described.

It should be understood that the term "and/or" in this specification describes only an association relationship for describing associated objects and represents that three relationships may exist. For example, A and/or B may represent the following three cases only A exists, both A and B exist, and only B exists. In addition, the character "/" in this specification generally indicates an "or" relationship between the associated objects.

It should be understood that, in various embodiments of the present disclosure, sequence numbers of the foregoing processes do not mean execution sequences. The execution sequences of the processes should be determined based on functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It can be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is one example. For example, the unit division is logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A packet transmission method implemented by a first network device, wherein the packet transmission method comprises:

determining a master logical interface at the first network device, wherein the master logical interface is associated with a first virtual network identifier and with a sub-logical interface at the first network device, wherein the sub-logical interface is associated with a second virtual network identifier, wherein the first virtual network identifier identifies a first virtual network, and wherein the second virtual network identifier identifies a second virtual network; and receiving, from a second master logical interface of a second network device, an advertisement packet through the master logical interface, wherein the advertisement packet is based on a first relationship between the sub-logical interface and the second virtual network identifier and a second relationship between the first master logical interface, the first virtual network identifier, and the second virtual network identifier, wherein the advertisement packet is based on an intermediate system to intermediate system (ISIS) protocol, wherein the advertisement packet comprises a type-length-value (TLV), and wherein the TLV comprises the first virtual network identifier and the second virtual network identifier.

2. The packet transmission method of claim 1, wherein after receiving the advertisement packet from the second network device, the packet transmission method further comprises:

generating a network topology of the second virtual network based on the second virtual network identifier, wherein the network topology of the second virtual network comprises the master logical interface and a second Internet Protocol (IP) information;

generating a second forwarding entry using the second IP information as destination IP information, wherein an outbound interface in the second forwarding entry is the master logical interface;

determining the sub-logical interface based on the master logical interface and the second virtual network identifier; and replacing the master logical interface in the second forwarding entry with the sub-logical interface.

3. The packet transmission method of claim 1, wherein after receiving the advertisement packet from the second network device, the packet transmission method further comprises:
generating a network topology of the first virtual network based on the first virtual network identifier, wherein the network topology of the first virtual network comprises the master logical interface and the first IP information; and
generating a first forwarding entry using a first Internet Protocol (IP) information as destination IP information, wherein an outbound interface in the first forwarding entry is the master logical interface.

4. The packet transmission method of claim 1, wherein before determining the master logical interface, the packet transmission method further comprises:
configuring the master logical interface and the sub-logical interface;
configuring the sub-logical interface as a slave interface of the master logical interface;
establishing a first relationship between the sub-logical interface and the second virtual network identifier; and
establishing a second relationship between the master logical interface, the first virtual network identifier, and the second virtual network identifier.

5. The packet transmission method of claim 1, wherein the advertisement packet further comprises a first node-segment identifier (node-SID) of the second network device in the first virtual network, and a second node-SID of the second network device in the second virtual network, wherein the first node-SID corresponds to the first virtual network identifier, and wherein the second node-SID corresponds to the second virtual network identifier.

6. The packet transmission method of claim 5, wherein the TLV further comprises at least one of a flag bit (Flags), a function-flag bit (Func-Flags), an endpoint function value, sizes of the first node-SID and the second node-SID, at least one sub-TLV, or a total length (sub-TLV-len) of all sub-TLVs.

7. The packet transmission method of claim 1, wherein the advertisement packet further comprises a first adjacency-segment identifier (adjacency-SID) of the second network device in the first virtual network, and a second adjacency-SID of the second network device in the second virtual network, wherein the first adjacency-SID corresponds to the first virtual network identifier, and wherein the second adjacency-SID corresponds to the second virtual network identifier.

8. The packet transmission method of claim 7, wherein the TLV further comprises at least one of a flag bit (Flags), a function-flag bit (Func-Flags), an endpoint function value, sizes of the first adjacency-SID and the second adjacency-SID, at least one sub-TLV, or a total length (sub-TLV-len) of all sub-TLVs.

9. A packet transmission method implemented by a first network device, wherein the packet transmission method comprises:
determining a master logical interface at the first network device, wherein the master logical interface is associated with a first virtual network identifier and with a sub-logical interface at the first network device, wherein the sub-logical interface is associated with a second virtual network identifier, wherein the first virtual network identifier identifies a first virtual network, and wherein the second virtual network identifier identifies a second virtual network; and sending an advertisement packet to a second master logical interface of a second network device through the master logical interface,
wherein the advertisement packet is based on a first relationship between the sub-logical interface and the second virtual network identifier and a second relationship between the first master logical interface, the first virtual network identifier, and the second virtual network identifier,
wherein the advertisement packet is based on an intermediate system to intermediate system (ISIS) protocol, wherein the advertisement packet comprises a type-length-value (TLV), and wherein the TLV comprises the first virtual network identifier and the second virtual network identifier.

10. The packet transmission method of claim 9, wherein before determining the master logical interface, the packet transmission method further comprises:
configuring the master logical interface and the sub-logical interface;
configuring the sub-logical interface as a slave interface of the master logical interface;
establishing a first relationship between the sub-logical interface and the second virtual network identifier; and
establishing a second relationship between the master logical interface, the first virtual network identifier, and the second virtual network identifier.

11. The packet transmission method of claim 9, wherein the advertisement packet further comprises a first node-segment identifier (node-SID) of the first network device in the first virtual network, and a second node-SID of the first network device in the second virtual network, wherein the first node-SID corresponds to the first virtual network identifier, and wherein the second node-SID corresponds to the second virtual network identifier.

12. The packet transmission method of claim 11, wherein the TLV further comprises at least one of a flag bit (Flags), a function-flag bit (Func-Flags), an endpoint function value, sizes of the first node-SID and the second node-SID, at least one sub-TLV, or a total length (sub-TLV-len) of all sub-TLVs.

13. The packet transmission method of claim 9, wherein the advertisement packet further comprises a first adjacency-segment identifier (adjacency-SID) of the first network device in the first virtual network, and a second adjacency-SID of the first network device in the second virtual network, wherein the first adjacency-SID corresponds to the first virtual network identifier, and wherein the second adjacency-SID corresponds to the second virtual network identifier.

14. The packet transmission method of claim 13, wherein the TLV further comprises at least one of a flag bit (Flags), a function-flag bit (Func-Flags), an endpoint function value, sizes of the first adjacency-SID and the second adjacency-SID, at least one sub-TLV, or a total length (sub-TLV-len) of all sub-TLVs.

15. A first network device comprising:
a processor configured to determine a master logical interface at the first network device, wherein the master logical interface is associated with a first virtual network identifier and with a sub-logical interface at the first network device, wherein the sub-logical interface is associated with a second virtual network identifier, wherein the first virtual network identifier identifies a first virtual network, and wherein the second virtual network identifier identifies a second virtual network; and a transceiver coupled to the processor and configured to receive an advertisement packet from a second master logical interface of a second network device through the master logical interface, wherein the advertisement packet is based on a first relationship between the sub-logical interface and the second virtual network identifier and a second relationship between the first master logical interface, the first virtual network identifier, and the second virtual network identifier, wherein the advertisement packet is based on an intermediate system to intermediate system (ISIS) protocol, wherein the advertisement packet comprises a type-length-value (TLV), and wherein the TLV comprises the first virtual network identifier and the second virtual network identifier.

16. The first network device of claim 15, wherein the processor is further configured to:

generate a network topology of the second virtual network based on the second virtual network identifier, wherein the network topology of the second virtual network comprises the master logical interface and a second Internet Protocol (IP) information;

generate a second forwarding entry using the second IP information as destination IP information, wherein an outbound interface in the second forwarding entry is the master logical interface;

determine the sub-logical interface based on the master logical interface and the second virtual network identifier; and replace the master logical interface in the second forwarding entry with the sub-logical interface.

17. The first network device of claim 15, wherein the processor is further configured to:

generate a network topology of the first virtual network based on the first virtual network identifier, wherein the network topology of the first virtual network comprises the master logical interface and a first Internet Protocol (IP) information; and generate a first forwarding entry using the first IP information as destination IP information, wherein an outbound interface in the first forwarding entry is the master logical interface.

18. A first network device comprising:

a processor configured to determine a master logical interface at the first network device, wherein the master logical interface is associated with a first virtual network identifier and with a sub-logical interface at the first network device, wherein the sub-logical interface is associated with a second virtual network identifier, wherein the first virtual network identifier identifies a first virtual network, and wherein the second virtual network identifier identifies a second virtual network; and a transceiver coupled to the processor and configured to send an advertisement packet to a second network device through the master logical interface, wherein the advertisement packet is based on a first relationship between the sub-logical interface and the second virtual network identifier and a second relationship between the first master logical interface, the first virtual network identifier, and the second virtual network identifier, wherein the advertisement packet is based on an intermediate system to intermediate system (ISIS) protocol, wherein the advertisement packet comprises a type-length-value (TLV), and wherein the TLV comprises the first virtual network identifier and the second virtual network identifier.

19. The first network device of claim 18, wherein the processor is further configured to:

configure the master logical interface and the sub-logical interface;

configure the sub-logical interface as a slave interface of the master logical interface;

establish a first relationship between the sub-logical interface and the second virtual network identifier; and establish a second relationship between the master logical interface, the first virtual network identifier, and the second virtual network identifier.

20. The first network device of claim 18, wherein the advertisement packet further comprises a first node-segment identifier (node-SID) of the first network device in the first virtual network, and a second node-SID of the first network device in the second virtual network, wherein the first node-SID corresponds to the first virtual network identifier, and wherein the second node-SID corresponds to the second virtual network identifier.

* * * * *